United States Patent
He et al.

(10) Patent No.: US 10,547,853 B2
(45) Date of Patent: Jan. 28, 2020

(54) HIGH LEVEL SYNTAX FOR HEVC EXTENSIONS

(71) Applicant: VID SCALE, INC., Wilmington, DE (US)

(72) Inventors: Yong He, San Diego, CA (US); Yan Ye, San Diego, CA (US); Xiaoyu Xiu, San Diego, CA (US); Yuwen He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 247 days.

(21) Appl. No.: 15/481,425

(22) Filed: Apr. 6, 2017

(65) Prior Publication Data

US 2017/0214923 A1     Jul. 27, 2017

Related U.S. Application Data

(63) Continuation of application No. 14/512,076, filed on Oct. 10, 2014, now Pat. No. 9,648,333.
(Continued)

(51) Int. Cl.
*H04N 19/103* (2014.01)
*H04N 19/159* (2014.01)
(Continued)

(52) U.S. Cl.
CPC ......... *H04N 19/159* (2014.11); *H04N 19/105* (2014.11); *H04N 19/187* (2014.11);
(Continued)

(58) Field of Classification Search
CPC .... H04N 19/159; H04N 19/70; H04N 19/105; H04N 19/30; H04N 19/46; H04N 19/184; H04N 19/172
See application file for complete search history.

(56) References Cited

U.S. PATENT DOCUMENTS 7,782,943 B2 *  8/2010  Jeon .................... H04N 19/597
                                              348/218.1
7,782,944 B2 *  8/2010  Jeon .................... H04N 19/597
                                              348/218.1
(Continued)

FOREIGN PATENT DOCUMENTS

CN   101536527 A   9/2009
CN   101548548 A   9/2009
(Continued)

OTHER PUBLICATIONS

Boyce J.,"Extensible High Layer Syntax for Scalability", Mar. 16-23, 2011, JCTVC-E279 (Year: 2011).*
(Continued)

*Primary Examiner* — Philip P. Dang
(74) *Attorney, Agent, or Firm* — Condo Roccia Koptiw LLP

(57) ABSTRACT

A video coding device may identify a network abstraction layer (NAL) unit. The video coding device may determine whether the NAL unit includes an active parameter set for a current layer. When the NAL unit includes the active parameter set for the current layer, the video coding device may set an NAL unit header layer identifier associated with the NAL unit to at least one of: zero, a value indicative of the current layer, or a value indicative of a reference layer of the current layer. The NAL unit may be a picture parameter set (PPS) NAL unit. The NAL unit may be a sequence parameter set (SPS) NAL unit.

20 Claims, 13 Drawing Sheets

Related U.S. Application Data

(60) Provisional application No. 61/889,919, filed on Oct. 11, 2013, provisional application No. 61/889,787, filed on Oct. 11, 2013.

(51) Int. Cl.
| | |
|---|---|
| *H04N 19/169* | (2014.01) |
| *H04N 19/70* | (2014.01) |
| *H04N 19/105* | (2014.01) |
| *H04N 19/187* | (2014.01) |
| *H04N 19/33* | (2014.01) |
| *H04N 19/30* | (2014.01) |
| *H04N 19/46* | (2014.01) |
| *H04N 19/172* | (2014.01) |
| *H04N 19/184* | (2014.01) |

(52) U.S. Cl.
CPC ........... *H04N 19/188* (2014.11); *H04N 19/30* (2014.11); *H04N 19/33* (2014.11); *H04N 19/46* (2014.11); *H04N 19/70* (2014.11); *H04N 19/172* (2014.11); *H04N 19/184* (2014.11)

(56) References Cited

U.S. PATENT DOCUMENTS

| | | | | |
|---|---|---|---|---|
| 8,170,108 | B2* | 5/2012 | Jeon | H04N 19/597 348/218.1 |
| 9,053,562 | B1* | 6/2015 | Rabin | G06F 16/583 |
| 9,351,009 | B2* | 5/2016 | Deshpande | H04N 19/503 |
| 9,532,067 | B2* | 12/2016 | Deshpande | H04N 19/50 |
| 9,554,149 | B2* | 1/2017 | Kim | H04N 19/513 |
| 9,591,321 | B2* | 3/2017 | Deshpande | H04N 19/70 |
| 9,654,786 | B2* | 5/2017 | Hendry | H04N 19/30 |
| 9,736,454 | B2* | 8/2017 | Hannuksela | H04N 13/161 |
| 9,774,927 | B2* | 9/2017 | Rusert | H04N 21/234327 |
| 9,807,421 | B2* | 10/2017 | Deshpande | H04N 19/597 |
| 9,924,166 | B2* | 3/2018 | Ye | H04N 19/46 |
| 2008/0013620 | A1* | 1/2008 | Hannuksela | H04N 19/597 375/240.01 |
| 2008/0095228 | A1* | 4/2008 | Hannuksela | H04N 19/70 375/240.01 |
| 2012/0275517 | A1* | 11/2012 | Boyce | H04N 19/70 375/240.12 |
| 2013/0162774 | A1* | 6/2013 | Tian | H04N 19/597 348/43 |
| 2013/0182755 | A1* | 7/2013 | Chen | H04N 19/70 375/240.01 |
| 2013/0243093 | A1* | 9/2013 | Chen | H04N 19/597 375/240.16 |
| 2013/0266077 | A1* | 10/2013 | Boyce | H04N 19/70 375/240.25 |
| 2014/0177718 | A1* | 6/2014 | Rusert | H04N 19/105 375/240.16 |
| 2014/0192859 | A1* | 7/2014 | Haque | H04N 19/597 375/240.02 |
| 2014/0301477 | A1* | 10/2014 | Deshpande | H04N 19/82 375/240.25 |
| 2015/0092836 | A1* | 4/2015 | Kang | H04N 19/188 375/240.02 |
| 2015/0237372 | A1* | 8/2015 | Choi | H04N 19/46 375/240.12 |
| 2015/0256838 | A1* | 9/2015 | Deshpande | H04N 19/70 375/240.02 |
| 2015/0288976 | A1* | 10/2015 | Hendry | H04N 19/70 375/240.12 |
| 2016/0191933 | A1 | 6/2016 | Ikai et al. | |

FOREIGN PATENT DOCUMENTS

| | | |
|---|---|---|
| WO | WO 2015/005331 A1 | 1/2015 |
| WO | WO 2015/195938 A1 | 12/2015 |

OTHER PUBLICATIONS

Ramasubramonian et al., "MV-HEVC/SHVC HLS: Representation Format Information in VPS", Qualcomm Incorporated and Vidyo, Document: JCTVC-N0092, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, pp. 1-4.

Boyce, Jill, "BoG Report on SHVC/MV-HEVC HLS Topics", JCTVC-N0374, 14th Meeting, Vienna, AT, Jul. 25-Aug. 2, 2013, 5 pages.

Bross et al., "High Efficiency Video Coding (HEVC) Text Specification Draft 10 (for FDIS & Last Call)", JCTVC-L1003_v34, 12th Meeting, Geneva, CH, Jan. 14-23, 2013, 310 pages.

Chen et al., "High Efficiency Video Coding (HEVC) Scalable Extension Draft 3", JCTVC-N1008_v3, 14th Meeting, Vienna, AT, Jul. 25-Aug. 2, 2013, 69 pages.

Chen et al., "SHVC Draft 3", JCTVC-N1008_v1, 14th Meeting, Vienna, AT, Jul. 25-Aug. 2, 2013, 71 pages.

Hannuksela et al., "Common Specification Text for Scalable and Multi-View Extensions (Revision of JCTVC-L0188 Straw-Man Text)", JCTVC-L0452r1, JCT3V-C0237r1, 12th Meeting, Geneva, CH, Jan. 14-23, 2013, 3rd Meeting: Geneva, CH, Jan. 17-23, 2013, 2 pages.

He, "AHG9: On Sub-Bitstream Extraction and Rewriting Process", JCTVC-P0182r2, JCTVC-G0160r2, 16th Meeting, San Jose, US, Jan. 9-17, 2014, 7th Meeting: San Jose, US, Jan. 11-17, 2014, 8 pages.

He, "MV-HEVC/SHVC HLS: On Nuh_Layer_id of SPS and PPS", JCTVC-O0092, JCT3V-F0040, 15th Meeting, Geneva, CH, Oct. 23-Nov. 1, 2013, 6th Meeting: Geneva, CH, Oct. 25-Nov. 1, 2013, 2 pages.

ISO/IEC, "Information Technology—Coding of Audio-Visual Objects—Part 2: Visual", ISO/IEC 14496-2, Second Edition, Dec. 1, 2001, 536 pages.

ISO/IEC, "Information Technology—Coding of Moving Pictures and Associated Audio for Digital Storage Media at up to About 1,5 Mbit/s—Part 2: Video", Ref. No. ISO/IEC 11172-2:1993/Cor. 3:2003(E), Nov. 1, 2003, 6 pages.

ITU, "Codec for Audiovisual Services AT n×384 kbit/s", Series H: Audiovisual and Multimedia Systems Coding of Moving Video, Reedition of CCITT Recommendation H.261 Published in the Blue Book, Fascicle III.6, Nov. 1988, 14 pages.

ITU-T, "Advanced Video Coding for Generic Audiovisual Services", ITU-T Recommendation H.264, Series H: Audiovisual and Multimedia Systems Infrastructure of Audiovisual Services—Coding of Moving Video, Nov. 2007, 563 pages.

ITU-T, "Information Technology—Generic Coding of Moving Pictures and Associated Audio Information: Video", ITU-T Recommendation H.262, Series H: Audiovisual and Multimedia Systems Infrastructure of Audiovisual Services—Coding of Moving Video, Feb. 2000, 12 pages.

ITU-T, "New Video Codec to Ease Pressure on Global Networks", Available at <http://www.itu.int/net/pressoffice/press_releases/2013/01.aspx#.V4R_fq7vNQI>, Retrieved on Jul. 12, 2016, Jan. 25, 2013, 1 page.

ITU-T, "Video Coding for Low Bit Rate Communication", ITU-T Recommendation H.263, Transmission of Non-Telephone Signals, Mar. 1996, 52 pages.

Ohm et al., "Work Plan in 3D Standards Development", JCT3V-B1006, 2nd Meeting, Shanghai, CN, Oct. 13-19, 2012, 5 pages.

Ohm, Jens-Rainer, "Advances in Scalable Video Coding", Proceedings of the IEEE, vol. 93, No. 1, Jan. 2005, pp. 42-56.

Sjoberg et al., "High-Level Syntax for Bitstream Extraction", JCTVC-G607, WG11 No. m22172, 7th Meeting: Geneva, CH, Nov. 21-30, 2011, 14 pages.

Sjoberg et al., "Overview of HEVC High-Level Syntax and Reference Picture Management", IEEE Transactions on Circuits and Systems for Video Technology, vol. 22, No. 12, Dec. 2012, pp. 1858-1870.

Ikai et al., "MV-HEVC/SHVC HLS: On Dependency Type for SHVC/MV-HEVC", Sharp Corporation, 14th Meeting: Vienna, Austria, Jul. 25-Aug. 2, 2013, 4 pages.

(56) References Cited

OTHER PUBLICATIONS

Thang et al., "Proposal to the Extension of Video Parameter Set", ETRI, University of Aizu, JCTVC-L0246, 12$^{th}$ Meeting: Geneva, CH, Jan. 14-23, 2013, 7 pages.
Chen et al., "High Efficiency Video Coding (HEVC) Scalable Extension Draft 3", JCTVC-N1008_v3, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, 69 pages.

* cited by examiner

HIGH LEVEL SYNTAX FOR HEVC EXTENSIONS

CROSS REFERENCE

This application is a continuation of U.S. Non-Provisional patent application Ser. No. 14/512,076, filed Oct. 10, 2014, which claims the benefit of U.S. Provisional Application No. 61/889,787 filed on Oct. 11, 2013 and U.S. Provisional Application No. 61/889,919 filed on Oct. 11, 2013, the contents of which are each hereby incorporated by reference herein in their entirety.

BACKGROUND

Various digital video compression technologies have been developed and standardized to enable efficient digital video communication, distribution, and consumption. Examples of standards that have been developed by ISO/IEC and/or ITU-T include H.261, MPEG-1, MPEG-2, H.263, MPEG-4 (part-2), and H.264/AVC (MPEG-4 part 10 Advance Video Coding). A video coding standard known as High Efficiency Video Coding (HEVC) was jointly developed by ITU-T Video Coding Experts Group (VCEG) and ISO/IEC MPEG. HEVC (ITU-T H.265 and ISO/IEC 23008-2) may be able to achieve substantially higher coding efficiency than the H.264/AVC standard.

SUMMARY

A video coding device may identify a network abstraction layer (NAL) unit. The video coding device may determine whether the NAL unit includes an active parameter set for a current layer. Based on a determination that the NAL unit includes the active parameter set for the current layer, the video coding device may set an NAL unit header layer identifier associated with the NAL unit to at least one of: zero, a value indicative of the current layer, or a value indicative of a reference layer of the current layer. The NAL unit may be a picture parameter set (PPS) NAL unit. The NAL unit may be a sequence parameter set (SPS) NAL unit. The value indicative of the current layer may include a layer identifier associated with the current layer. The value indicative of the reference layer of the current layer may include a layer identifier associated with the reference layer of the current layer. The video coding device may send a video bitstream comprising the NAL unit to a video decoding device.

A video coding device may receive a video bitstream including an SPS and a video parameter set (VPS). The VPS may include a list of video representation formats. The video coding device may determine a video representation format for a layer associated with the SPS, for example, based on an update video representation format flag in the SPS. If the update video representation format flag indicates that a representation format index is present in the SPS, the video coding device may determine the video representation format from the list of video representation formats in the VPS based on the representation format index. If the update representation format index is absent in the SPS, the video coding device may determine video representation format from a default video representation format. The video coding device may determine whether the representation format index is present in the SPS, for example, based on the update video representation format flag in the SPS. For example, if the update video representation format flag equals 1, the video coding device may determine that the representation format index is present in the SPS. If the update video representation format flag equals 0, the video coding device may determine that the representation format index is absent in the SPS. The default video representation format may include a default video representation format specified in the VPS for the layer. The video update representation format index may be in a range between 0 and the value of the VPS number representation format minus 1, inclusive.

A video coding device may assign a representation format for a layer associated with an SPS. The video coding device may determine whether to include a representation format index in the SPS, for example, based on the assigned representation format for the layer associated with the SPS. The representation format index may not be included in the SPS, for example, if the assigned representation format is a default representation format. The representation format index may be included in the SPS, for example, if the assigned representation format is specified in the VPS. The video coding device may set an update video representation format flag to indicate whether the representation format index is included in the SPS. The video coding device may set the update video representation format flag equal to 1 to indicate the representation format index is present in the SPS. The video coding device may set the update video representation format flag equal to 0 to indicate the representation format index is absent in the SPS.

A video coding device may receive a video bitstream including a VPS and one or more layers. The video coding device may determine direct dependency relations associated with one or more of the layers, for example, based on a default direct dependency flag in the VPS. If the default direct dependency flag indicates that direct dependency type information is present in the VPS, the video coding device may determine the direct dependency relations from the direct dependency type information in the VPS. If the default direct dependency flag indicates the direct dependency type information is absent in the VPS, the video coding device may determine the direct dependency relations based on a default. The default dependency may apply to all layers in the plurality of layers.

A video coding device may determine whether to include direct dependency type information in the VPS. If the video coding device decides to use default dependencies, the video coding device may bypass signaling the direct dependency type information in the VPS. If the video coding device decides not to use default dependencies, the video coding device may include the direct dependency type information in the VPS. The video coding device may set a default direct dependency flag in the VPS to indicate whether the direct dependency type information is signaled in the VPS.

A multi-loop SHVC encoder may include a processor with executable instructions for limiting the number of reference layers for a profile. The multi-loop SHVC encoder may set a reference layer limit. The multi-loop SHVC encoder may encode a video signal into layers for the profile such that the total number of direct and indirect reference layers for a given layer in the encoded video signal is less than the reference layer limit.

A multi-loop SHVC encoder may have a processor with executable instructions for limiting the number of reference layers for a profile. The multi-loop SHVC encoder may set a reference layer limit. The multi-loop SHVC encoder may encode a video signal into layers for the profile that comprise direct and indirect layers. For each layer, the multi-loop SHVC encoder may determine the total number of direct and indirect reference layers. The multi-loop SHVC encoder may determine whether the total number of direct and indirect reference layers for the layer is less than the reference layer limit. The multi-loop SHVC encoder may send the encoded video signal to a decoder, for example, if the total number of direct and indirect reference layers for each layer is less than the reference layer limit.

A video coding device may restrict and/or reduce a coding complexity for a multi-loop SHVC codec, for example, by applying one or more constraints to limit a number of layers. The layers may be direct dependent layers, indirect dependent layers, and/or a base layer. One or more constraints may be, for example, limiting a maximum number of the direct dependent layers or limiting a maximum number of direct and indirect dependent layers. The video coding device may limit the maximum number of direct dependent layers in the profile via at least one of a syntax element in a VPS extension, a syntax element in an SPS, a profile indication, and/or a profile, tier and/or level (e.g., a scalable main profile). The video coding device may limit the maximum number of direct and indirect dependent layers in the profile via at least one of a syntax element in a VPS extension, a syntax element in an SPS, a profile indication, and/or a profile, tier, and/or level (e.g., a scalable main profile). A constraint may be a constraint on the base layer. The constraint on the base layer may use a conforming SHVC bitstream. The conforming SHVC bitstream may be one or more access units, for example, including a picture with its nuh_layer_id equal to 0 and TemporalId equal to 0. A layer including the picture with nuh_layer_id equal to 0 and TemporalId equal to 0 may be the direct or indirect dependent layer of the layer for each nuh_layer_id value in a layer identifier list, TargetDecLayerIdList. The video coding device may signal one or more constraints via a derived variable. The video coding device may signal one or more constraints via a syntax element.

DETAILED DESCRIPTION

Figure 1:
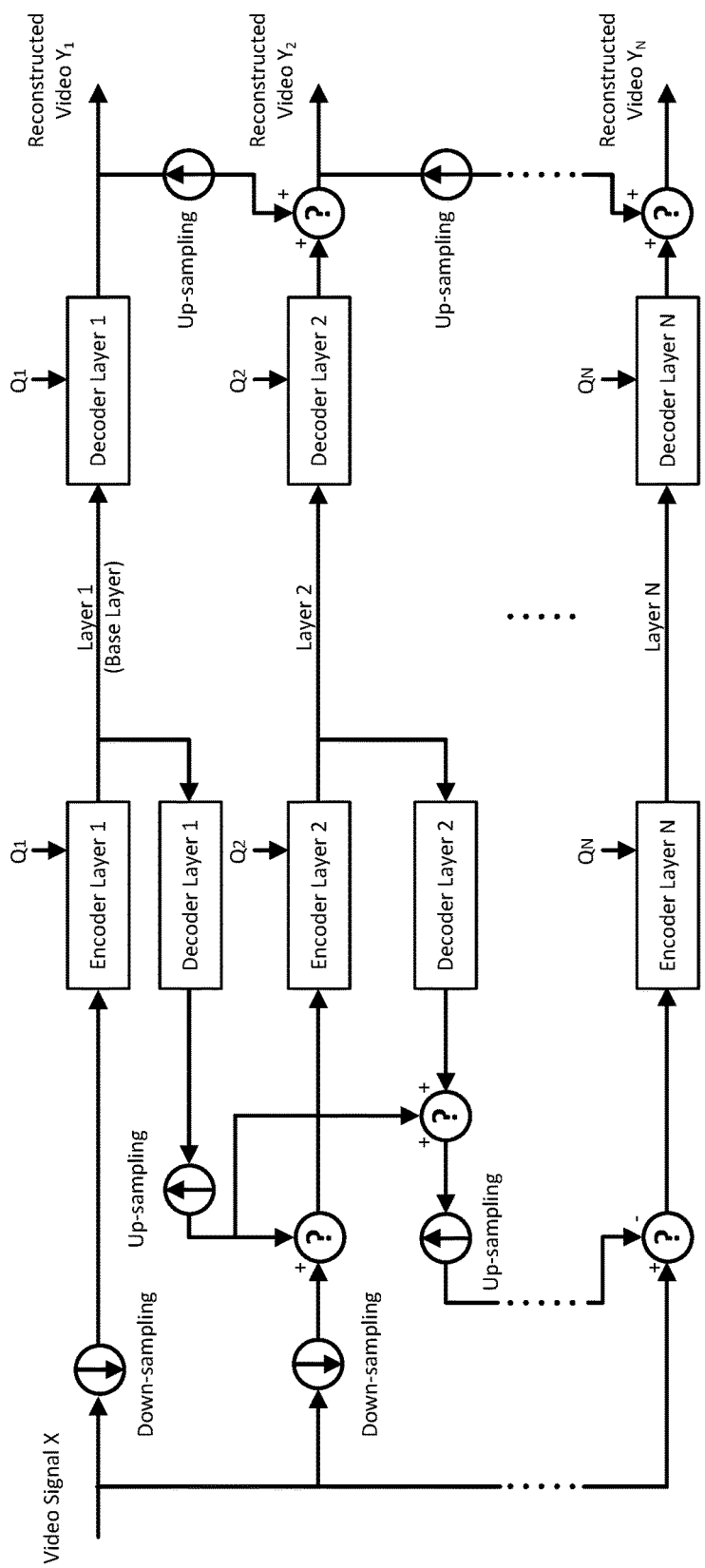
FIG. 1 depicts an example multi-layer scalable video coding system.

A detailed description of illustrative embodiments will now be described with reference to the various Figures. Although this description provides a detailed example of possible implementations, it should be noted that the details are intended to be exemplary and in no way limit the scope of the application.

Compared to traditional digital video services, such as sending TV signals over satellite, cable and terrestrial transmission channels, more and more video applications, such as IPTV, video chat, mobile video, and streaming video, may be deployed in heterogeneous environments. For example, video applications may provide video streaming in networks with different size cells, and/or the like. Heterogeneity may exist on or at a client, as well as in a network. For example, on the client side, an N-screen scenario that is consuming video content on devices with varying screen sizes and display capabilities, including a smart phone, tablet, PC and TV, and/or the like may be provided and/or used. On the network side, video may be transmitted across the Internet, WiFi networks, mobile (3G and 4G) networks, and/or any combination thereof.

Scalable video coding may encode a signal once at the highest resolution. Scalable video coding may enable decoding from subsets of the streams depending on the specific rate and resolution required by certain application and/or supported by the client device. The resolution may be defined by a number of video parameters including, but not limited to, spatial resolution (e.g., picture size), temporal resolution (e.g., frame rate), video quality (e.g., subjective quality such as MOS, and/or objective quality such as PSNR or SSIM or VQM), and/or the like. Other commonly used video parameters may include a chroma format (e.g., such as YUV420 or YUV422 or YUV444), bit-depth (e.g., such as 8-bit or 10-bit video), complexity, view, gamut, and/or aspect ratio (e.g., 16:9 or 4:3). International video standards such as MPEG-2 Video, H.263, MPEG4 Visual and H.264 may have tools and/or profiles that support scalability modes.

Scalable video coding may enable the transmission and decoding of partial bitstreams. The transmission and decoding of partial bitstreams may enable a scalable video coding (SVC) system to provide video services with lower temporal and/or spatial resolutions or reduced fidelity, while retaining a relatively high reconstruction quality (e.g., given respective rates of the partial bitstreams). SVC may be implemented with single loop decoding, such that an SVC decoder may set up one motion compensation loop at a layer being decoded, and may not set up motion compensation loops at one or more other lower layers. For example, a bitstream may include two layers, including a first layer (layer 1) that may be a base layer and a second layer (layer 2) that may be an enhancement layer. When such an SVC decoder reconstructs layer 2 video, the setup of a decoded picture buffer and motion compensated prediction may be limited to layer 2. In such an implementation of SVC, respective reference pictures from lower layers may not be fully reconstructed, which may reduce computational complexity and/or memory consumption at the decoder.

Single loop decoding may be achieved by constrained inter-layer texture prediction, where, for a current block in a given layer, spatial texture prediction from a lower layer may be permitted if a corresponding lower layer block is coded in intra mode. This may be referred to as restricted intra prediction. When a lower layer block is coded in intra mode, it may be reconstructed without motion compensation operations and/or a decoded picture buffer.

SVC may implement one or more additional inter-layer prediction techniques such as motion vector prediction, residual prediction, mode prediction, etc., from one or more lower layers. This may improve rate-distortion efficiency of an enhancement layer. An SVC implementation with single loop decoding may exhibit reduced computational complexity and/or reduced memory consumption at the decoder, and may exhibit increased implementation complexity, for example, due to reliance on block-level inter-layer prediction. To compensate for a performance penalty that may be incurred by imposing a single loop decoding constraint, encoder design and computation complexity may be increased to achieve desired performance. Coding of interlaced content may not be supported by SVC.

FIG. 1 is a simplified block diagram depicting an example block-based, hybrid scalable video coding (SVC) system. A spatial and/or temporal signal resolution to be represented by the layer 1 (base layer) may be generated by downsampling of the input video signal. In a subsequent encoding stage, a setting of the quantizer such as Q1 may lead to a quality level of the base information. One or more subsequent higher layer(s) may be encoded and/or decoded using the base-layer reconstruction Y1, which may represent an approximation of higher layer resolution levels. An upsampling unit may perform upsampling of the base layer reconstruction signal to a resolution of layer-2. Downsampling and/or upsampling may be performed throughout a plurality of layers (e.g., for N layers, layers 1, 2 . . . N). Downsampling and/or upsampling ratios may be different, for example depending on a dimension of a scalability between two layers.

In the example scalable video coding system of FIG. 1, for a given higher layer n (e.g., 2≤n≤5 N, N being the total number of layers), a differential signal may be generated by subtracting an upsampled lower layer signal (e.g., layer n−1 signal) from a current layer n signal. This differential signal may be encoded. If respective video signals represented by two layers, n1 and n2, have the same spatial resolution, corresponding downsampling and/or upsampling operations may be bypassed. A given layer n (e.g., 1≤n≤N), or a plurality of layers, may be decoded without using decoded information from higher layers.

Relying on the coding of a residual signal (e.g., a differential signal between two layers) for layers other than the base layer, for example using the example SVC system of FIG. 1, may cause visual artifacts. Such visual artifacts may be due to, for example, quantization and/or normalization of the residual signal to restrict its dynamic range and/or quantization performed during coding of the residual. One or more higher layer encoders may adopt motion estimation and/or motion compensated prediction as respective encoding modes. Motion estimation and/or compensation in a residual signal may be different from conventional motion estimation, and may be prone to visual artifacts. In order to reduce (e.g., minimize) the occurrence of visual artifacts, a more sophisticated residual quantization may be implemented, for example along with a joint quantization process that may include both quantization and/or normalization of the residual signal to restrict its dynamic range and quantization performed during coding of the residual. Such a quantization process may increase complexity of the SVC system.

Multi-view video coding (MVC) may provide view scalability. In an example of view scalability, a base layer bitstream may be decoded to reconstruct a conventional two dimensional (2D) video, and one or more additional enhancement layers may be decoded to reconstruct other view representations of the same video signal. When such views are combined together and displayed by a three dimensional (3D) display, 3D video with proper depth perception may be produced.

Figure 2:
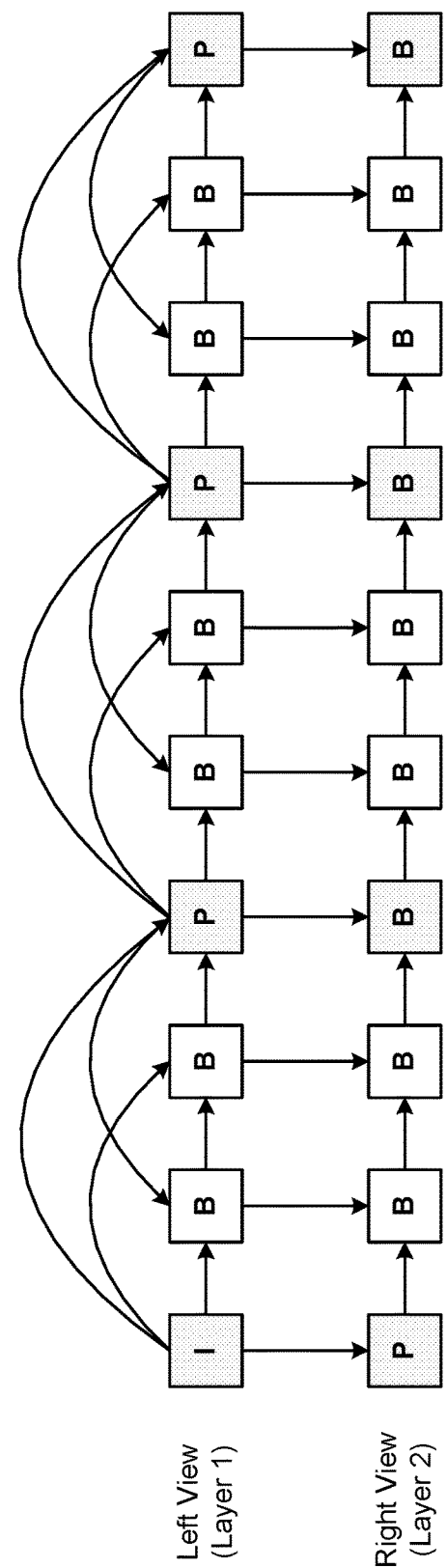
FIG. 2 depicts an example of temporal and inter-layer prediction for stereoscopic video coding.

FIG. 2 depicts an example prediction structure for using MVC to code a stereoscopic video with a left view (layer 1) and a right view (layer 2). The left view video may be coded with an I-B-B-P prediction structure, and the right view video may be coded with a P-B-B-B prediction structure. As shown in FIG. 2, in the right view, the first picture collocated with the first I picture in the left view may be coded as a P picture, and subsequent pictures in the right view may be coded as B pictures with a first prediction coming from temporal references in the right view, and a second prediction coming from inter-layer reference in the left view. MVC may not support the single loop decoding feature. For example, as shown in FIG. 2, decoding of the right view (layer 2) video may be conditioned on the availability of an entirety of pictures in the left view (layer 1), with each layer (view) having a respective compensation loop. An implementation of MVC may include high level syntax changes, and may not include block-level changes. This may ease implementation of MVC. For example, MVC may be implemented by configuring reference pictures at the slice and/or picture level. MVC may support coding of more than two views, for instance by extending the example shown in FIG. 2 to perform inter-layer prediction across multiple views.

MPEG frame compatible (MFC) video coding may provide a scalable extension to 3D video coding. For example, MFC may provide a scalable extension to frame compatible base layer video (e.g., two views packed into the same frame), and may provide one or more enhancement layers to recover full resolution views. Stereoscopic 3D video may have two views, including a left and a right view. Stereoscopic 3D content may be delivered by packing and/or multiplexing the two views into one frame, and by compressing and transmitting the packed video. At a receiver side, after decoding, the frames may be unpacked and displayed as two views. Such multiplexing of the views may be performed in the temporal domain or the spatial domain. When performed in the spatial domain, in order to maintain the same picture size, the two views may be spatially downsampled (e.g., by a factor of two) and packed in accordance with one or more arrangements. For example, a side-by-side arrangement may put the downsampled left view on the left half of the picture and the downsampled right view on the right half of the picture. Other arrangements may include top-and-bottom, line-by-line, checkerboard, etc. The arrangement used to achieve frame compatible 3D video may be conveyed by one or more frame packing arrangement SEI messages, for example. Although such arrangement may achieve 3D delivery with minimal increase in bandwidth consumption, spatial downsampling may cause aliasing in the views and/or may reduce the visual quality and user experience of 3D video.

Video applications, such as IPTV, video chat, mobile video, and/or streaming video, may be deployed in heterogeneous environments. Heterogeneity may exist on the client side. Heterogeneity may exist in a network. An N-screen may comprise consuming video content on devices with varying screen sizes and/or display capabilities, including smart phones, tablets, PCs, and/or TVs. An N-screen may contribute to heterogeneity, for example, on the client side. Video may be transmitted across the Internet, WiFi networks, mobile networks (e.g., 3G and/or 4G), and/or any combination of these networks, for example, on the network side. Scalable video coding may improve the user experience and/or video quality of service. Scalable video coding may involve encoding a signal at the highest resolution. Scalable video coding may involve enabling decoding from subsets of streams, for example, depending on the available network bandwidth and/or video resolution used by certain applications and/or supported by the client device. Resolution may be characterized by a number of video parameters. Video parameters may comprise one or more of the following: spatial resolution, temporal resolution, video quality, chroma format, bit-depth, complexity, view, color gamut, and/or aspect ratio, etc. Spatial resolution may comprise picture size. Temporal resolution may comprise frame rate. Video quality may comprise subjective quality, such as MOS, and/or objective quality, such as PSNR, SSIM or VQM. Chroma format may comprise YUV420, YUV422 or YUV444, etc. Bit-depth may comprise 8-bit video, 10-bit video, etc. Aspect ratio may comprise 16:9 or 4:3, etc. HEVC scalable extension may support at least spatial scalability (e.g., the scalable bitstream may include signals at more than one spatial resolution), quality scalability (e.g., the scalable bitstream may include signals at more than one quality level), and/or standard scalability (e.g., the scalable bitstream may include a base layer coded using H.264/AVC and one or more enhancement layers coded using HEVC). In spatial scalability, the scalable bitstream may comprise signals at one or more spatial resolution. In quality scalability, the scalable bitstream may comprise signals at one or more quality levels. In standard scalability, the scalable bitstream may comprise a base layer coded using, for example, H.264/AVC, and one or more enhancement layers coded using, for example, HEVC. Quality scalability may be referred to as SNR scalability. View scalability may support 3D video applications. In view scalability, the scalable bitstream may include both 2D and 3D video signals.

A video coding system (e.g., a video coding system in accordance with scalable extensions of high efficiency video coding (SHVC)) may include one or more devices that are configured to perform video coding. A device that is configured to perform video coding (e.g., to encode and/or decode video signals) may be referred to as a video coding device. Such video coding devices may include video-capable devices, for example, a television, a digital media player, a DVD player, a Blu-ray™ player, a networked media player device, a desktop computer, a laptop personal computer, a tablet device, a mobile phone, a video conferencing system, a hardware and/or software based video encoding system, or the like. Such video coding devices may include wireless communications network elements, such as a wireless transmit/receive unit (WTRU), a base station, a gateway, or other network elements.

Figure 3:
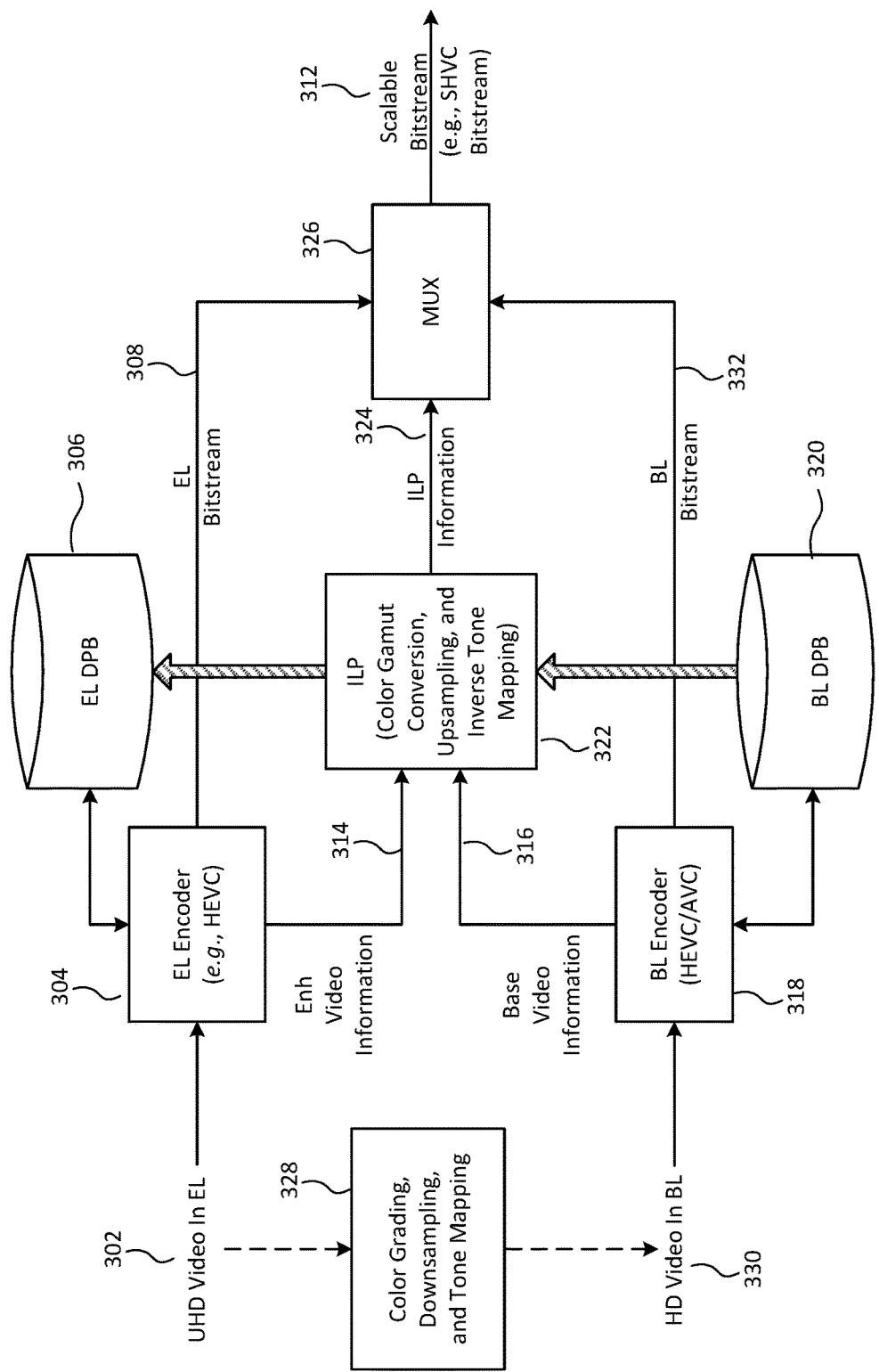
FIG. 3 is a simplified block diagram illustrating an example two-layer scalable video encoder that may be configured to perform HD to UHD scalability.

FIG. 3 is a simplified block diagram illustrating an example encoder (e.g., an SHVC encoder). The illustrated example encoder may be used to generate a two-layer HD-to-UHD scalable bitstream. As shown in FIG. 3, the base layer (BL) video input 330 may be an HD video signal, and the enhancement layer (EL) video input 302 may be a UHD video signal. The HD video signal 330 and the UHD video signal 302 may correspond to each other, for example by one or more of: one or more downsampling parameters (e.g., spatial scalability): one or more color grading parameters (e.g., color gamut scalability), or one or more tone mapping parameters (e.g., bit depth scalability) 328.

The BL encoder 318 may include, for example, a high efficiency video coding (HEVC) video encoder or an H.264/AVC video encoder. The BL encoder 318 may be configured to generate the BL bitstream 332 using one or more BL reconstructed pictures (e.g., stored in the BL DPB 320) for prediction. The EL encoder 304 may include, for example, an HEVC encoder. The EL encoder 304 may include one or more high level syntax modifications, for example to support inter-layer prediction by adding inter-layer reference pictures to the EL DPB. The EL encoder 304 may be configured to generate the EL bitstream 308 using one or more EL reconstructed pictures (e.g., stored in the EL DPB 306) for prediction.

One or more reconstructed BL pictures in the BL DPB 320 may be processed, at inter-layer processing (ILP) unit 322, using one or more picture level inter-layer processing techniques, including one or more of upsampling (e.g., for spatial scalability), color gamut conversion (e.g., for color gamut scalability), or inverse tone mapping (e.g., for bit depth scalability). The one or more processed reconstructed BL pictures may be used as reference pictures for EL coding. Inter-layer processing may be performed based on enhancement video information 314 received from the EL encoder 304 and/or the base video information 316 received from the BL encoder 318. This may improve EL coding efficiency.

At 326, the EL bitstream 308, the BL bitstream 332, and the parameters used in inter-layer processing such as ILP information 324, may be multiplexed together into a scalable bitstream 312. For example, the scalable bitstream 312 may include an SHVC bitstream.

Figure 4:
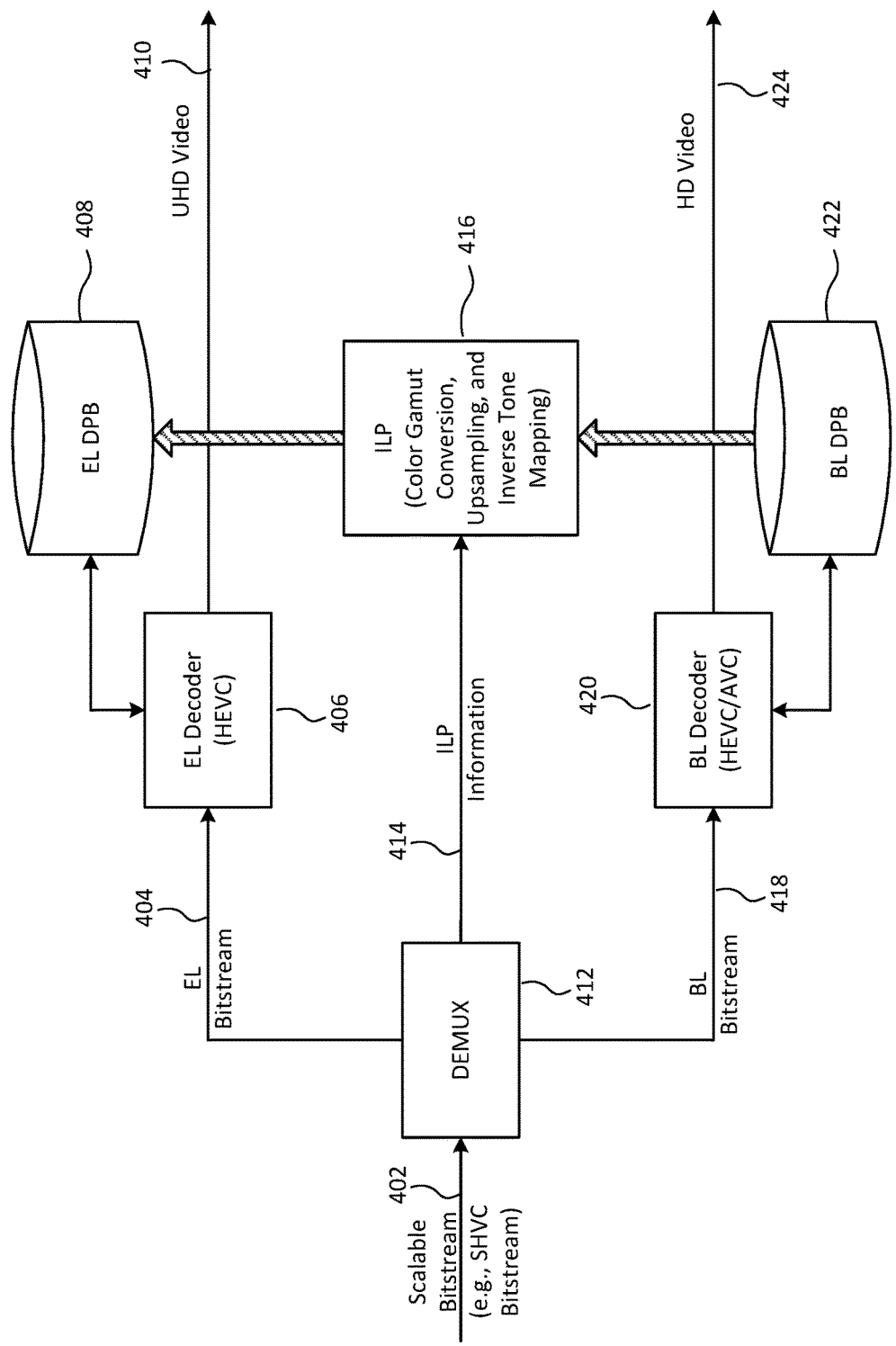
FIG. 4 is a simplified block diagram illustrating an example two-layer scalable video decoder that may be configured to perform HD to UHD scalability.

FIG. 4 is a simplified block diagram illustrating an example decoder (e.g., an SHVC decoder) that may correspond to the example encoder depicted in FIG. 3. The illustrated example decoder may be used, for example, to decode a two-layer HD-to-UHD bitstream.

As shown in FIG. 4, a demux module 412 may receive a scalable bitstream 402, and may demultiplex the scalable bitstream 402 to generate ILP information 414, an EL bitstream 404 and a BL bitstream 418. The scalable bitstream 402 may include an SHVC bitstream. The EL bitstream 404 may be decoded by EL decoder 406. The EL decoder 406 may include, for example, an HEVC video decoder. The EL decoder 406 may be configured to generate UHD video signal 410 using one or more EL reconstructed pictures (e.g., stored in the EL DPB 408) for prediction. The BL bitstream 418 may be decoded by BL decoder 420. The BL decoder 420 may include, for example, an HEVC video decoder or an H.264/AVC video. The BL decoder 420 may be configured to generate HD video signal 424 using one or more BL reconstructed pictures (e.g., stored in the BL DPB 422) for prediction. The reconstructed video signals such as UHD video signal 410 and HD video signal 424 may be used to drive the display device.

One or more reconstructed BL pictures in the BL DPB 422 may be processed, at ILP unit 916, using one or more picture level inter-layer processing techniques. Such picture level inter-layer processing techniques may include one or more of upsampling (e.g., for spatial scalability), color gamut conversion (e.g., for color gamut scalability), or inverse tone mapping (e.g., for bit depth scalability). The one or more processed reconstructed BL pictures may be used as reference pictures for EL decoding. Inter-layer processing may be performed based on the parameters used in inter-layer processing such as ILP information 414. The prediction information may comprise prediction block sizes, one or more motion vectors (e.g., which may indicate direction and amount of motion), and/or one or more reference indices (e.g., which may indicate from which reference picture the prediction signal is to be obtained).

This may improve EL decoding efficiency.

A reference index based framework may utilize block-level operations similar to block-level operations in a single-layer codec. Single-layer codec logics may be reused within the scalable coding system. A reference index based framework may simplify the scalable codec design. A reference index based framework may provide flexibility to support different types of scalabilities, for example, by appropriate high level syntax signaling and/or by utilizing inter-layer processing modules to achieve coding efficiency. One or more high level syntax changes may support inter-layer processing and/or the multi-layer signaling of SHVC.

A high level syntax design for SHVC may comprise, for example, parameter set identification constraints, high level syntax element and semantic improvements, and/or a decoding process for the corresponding syntax/semantic changes.

Parameter sets may be a video parameter set (VPS), a sequence parameter set (SPS), and/or a picture parameter set (PPS). Parameter sets may be high level syntax structures that may comprise syntax elements. Syntax elements may apply to multiple bitstream layers. Syntax elements may apply to a number of coded pictures within one layer. The parameter sets may be sent with the coded pictures of the video bit stream. For example, a video coding device may be configured to send parameter sets with the coded pictures of the video bit stream. The parameter sets may be sent through other means, such as out-of-band transmission using reliable channels, hard coding, etc. A video coding device may be configured to send parameter sets through other means, such as out-of-band transmission using reliable channels, hard coding, etc. A slice header may comprise picture related information that may be relatively small or relevant for certain slice or picture types. The slice header may be considered part of the high level syntax.

Table 1 illustrates an example NAL unit header syntax structure. An identifier nuh_layer_id may specify the identifier of the layer. The value of nuh_layer_id may be equal to 0. For example, the value of nuh_layer_id may be equal to 0 for VPS. Table 2 illustrates an example of partial SPS syntax structures. Table 3 illustrates an example of partial PPS syntax structures. Table 4 illustrates an example of partial slice header syntax structures.

TABLE 1

Example NAL Unit Header Syntax

| nal_unit_header( ) { | Descriptor |
| --- | --- |
| forbidden_zero_bit | f(1) |
| nal_unit_type | u(6) |
| nuh_layer_id | u(6) |
| nuh_temporal_id_plus1 | u(3) |
| } | |

TABLE 2

Example Sequence Parameter Set (SPS) Syntax

| seq_parameter_set_rbsp( ) { | Descriptor |
| --- | --- |
| .... | |
| sps_seq_parameter_set_id | ue(v) |
| .... | |
| } | |

TABLE 3

Example Picture Parameter Set (PPS) Syntax

| pic_parameter_set_rbsp( ) { | Descriptor |
| --- | --- |
| pps_pic_parameter_set_id | ue(v) |
| pps_seq_parameter_set_id | ue(v) |
| .... | u(1) |
| } | |

TABLE 4

Example Slice Segment Header Syntax

| slice_segment_header( ) { | Descriptor |
| --- | --- |
| .... | |
| slice_pic_parameter_set_id | ue(v) |
| .... | |
| } | |

Figure 5:
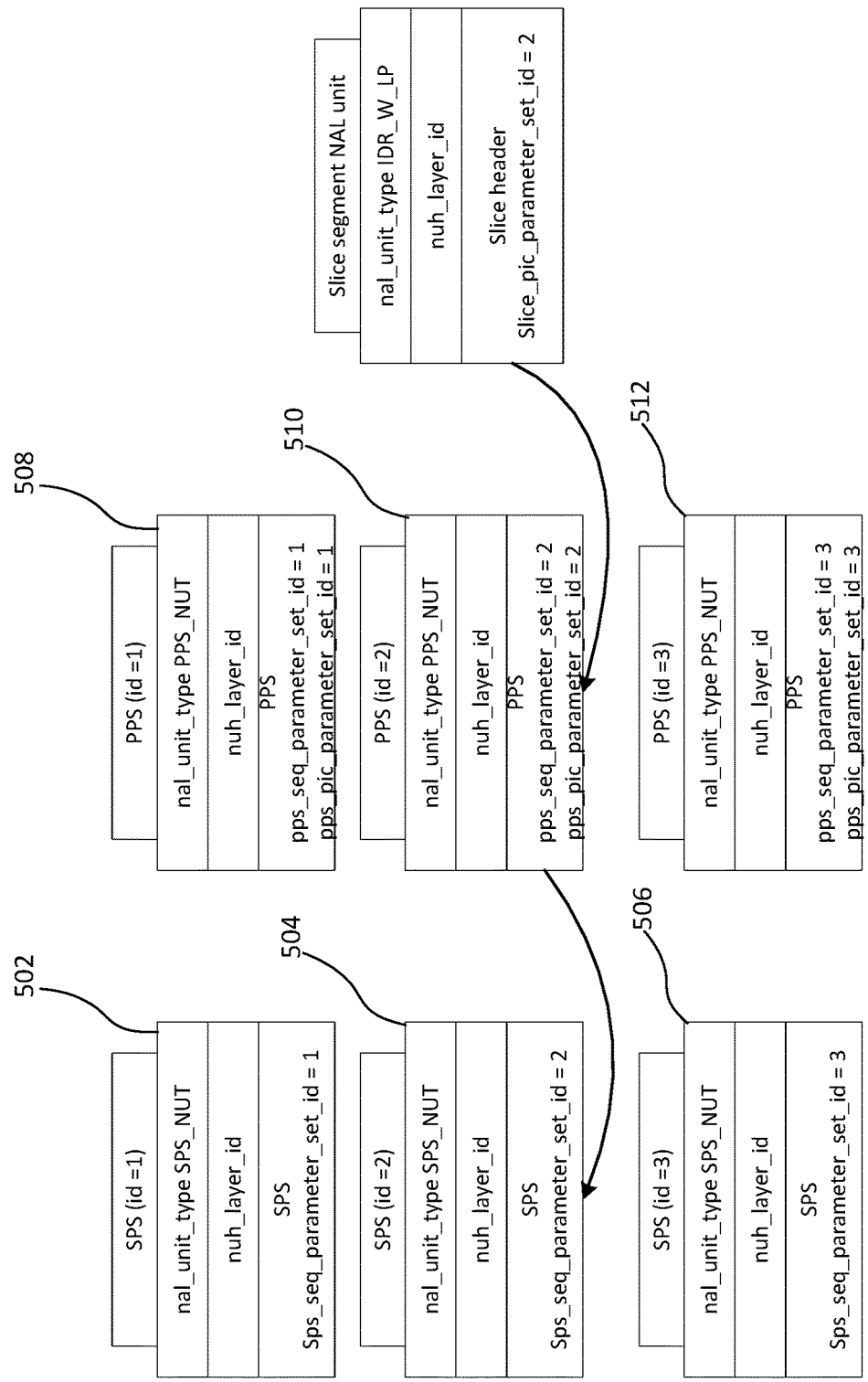
FIG. 5 is a diagram illustrating an example of sequence parameter set (SPS) and picture parameter set (PPS) activation.

FIG. 5 illustrates an example of SPS and PPS activation with the NAL unit of SPS, PPS, and slice segment header. The NAL unit may comprise an NAL unit header and/or a NAL unit header layer identifier. The NAL unit may comprise payload data. An example NAL unit header is illustrated in Table 1. The NAL unit payload data may comprise data such as SPS, PPS, and/or slice segment data, for example, depending on the NAL unit type (nal_unit_type).

In the example shown in FIG. 5, one or more SPS NAL units 502, 504, 506 may have unique SPS identifiers (sps_seq_parameter_set_id). One or more PPS NAL units 508, 510, 512 may comprise unique PPS identifiers (pps_pic_parameter_set_id). The coding picture slice header may comprise a syntax element, slice_pic_parameter_set_id. The syntax element slice_pic_parameter_set_id may indicate the PPS NAL unit to which the slice is referring. For example, a video coding device may set the syntax element slice_pic_parameter_set_id to indicate the PPS NAL unit to which the slice is referring. A video decoding device may use the syntax element slice_pic_parameter_set_id to determine the PPS NAL unit to which the slice is referring. A video coding device, such as the video coding device illustrated in FIG. 1, the video encoder illustrated in FIG. 3 and/or the video decoder illustrated in FIG. 4, may activate a video signal and/or layer of a video signal. For example, in FIG. 5 the slice is referring to the PPS NAL unit 510 with pps_pic_parameter_set_id equal to 2. The video coding device may be configured to activate PPS NAL unit 510 with the pps_pic_parameter_set_id equal to 2. The PPS NAL unit 510 with the pps_pic_parameter_id equal to 2 may refer to a SPS NAL unit with its syntax element pps_seq_parameter_set_id. In the example shown in FIG. 5, the active PPS NAL unit's pps_seq_parameter_set_id is equal to 2. The video coding device may be configured to activate the SPS NAL unit 504 with sps_seq_parameter_set_id equal to 2.

A video coding device may activate an SPS and/or a PPS when the SPS and/or PPS unit is referred to by another NAL unit. For example, a PPS may be activated by an NAL unit comprising a coded slice. The slice header of the coded slice may include a syntax element of slice_pic_parameter_set_id. The PPS may include a syntax element of pps_seq_parameter_set_id. The SPS and/or PPS that are identified by the slice_pic_parameter_set_id and/or pps_seq_parameter_set_id syntax elements in another NAL unit may be activated.

The video coding device may activate an SPS or a PPS, for example, if the nuh_layer_id value of the activating SPS or PPS is less than or equal to the layer it activates. The value of the activating SPS or PPS nuh_layer_id may be unequal to the nuh_layer_id of the activated layer. The value of the activating SPS or PPS nuh_layer_id may be unequal to the value of the nuh_layer_id of one of the dependent layers of the activated layer. A video coding device, such as a decoder, may remove the SPS or PPS NAL unit during the sub-bitstream extraction process. The SPS or PPS NAL unit may be removed, for example, during the sub-bitstream extraction process, since it may be difficult to identify that the SPS or PPS provides information (e.g., essential information) for a particular layer. If a mistake in bitstream extraction occurs, and a video coding device removes an SPS or PPS (e.g., an essential SPS or PPS) in bitstream extraction, then at least one of the layers in the resulting bitstream may not be decoded correctly due to a missing SPS and/or PPS. In the bitstream extraction process, a video coding device, such as a decoder, may parse each of the NAL units in the layers that the video coding device may want to preserve. The video coding device may ensure that SPS or PPS (e.g., necessary SPS or PPS) are not dropped, for example, by parsing each of the NAL units in the layers that the video coding device may want to preserve.

A video coding device may identify a NAL unit and may determine whether the NAL unit includes an active parameter set for a current layer. Based on a determination that the NAL unit includes the active parameter set for the current layer, the video coding device may set an NAL unit header layer identifier associated with the NAL unit to at least one of: zero, a value indicative of the current layer, or a value indicative of a reference layer of the current layer. A reference layer may include a dependent layer, and they may be used interchangeably herein. The NAL unit may be a PPS NAL unit, an SPS NAL unit, and/or the like. The value indicative of the current layer may be a value indicative of the layer identifier associated with the current layer signaled in the NAL unit header. The value indicative of the reference layer of the current layer may be a value indicative of the layer identifier of the reference layer of the current layer signaled in the NAL unit header. The video coding device may send a video bitstream comprising the NAL unit to a video decoding device.

For example, a video coding device, such as an encoder, may be configured to set the value of nuh_layer_id of the activating SPS or PPS NAL unit equal to 0. The video coding device may constrain the value of nuh_layer_id of the activating SPS or PPS NAL unit to 0.

The video coding device may set the value of nuh_layer_id of the activating SPS or PPS NAL unit to be equal to the value of the current layer. The video coding device may set the value of nuh_layer_id of the activating SPS or PPS NAL unit to be equal to the value of a dependent layer of the current layer. The video coding device may constrain the value of nuh_layer_id of the activating SPS or PPS NAL unit to be equal to the value of the current layer. The video coding device may constrain the value of nuh_layer_id of the activating SPS or PPS NAL unit to be equal to the value of a dependent layer of the current layer.

A video coding device may apply a constraint, for example, to enable the identification of the corresponding SPS or PPS NAL units involved in decoding of a given layer. A video coding device may enable the identification of the corresponding SPS or PPS NAL units involved in decoding of a given layer, for example, by identifying the values of the nuh_layer_id of the corresponding SPS or PPS NAL units. A video coding device may identify the values of the nuh_layer_id of the corresponding SPS or PPS NAL units. A video coding device may omit deep packet inspection, for example, in sub-bitstream extraction. Sub-bitstream extraction may ensure SPS or PPS NAL units are not dropped.

A video coding device may be configured to employ sub-bitstream extraction. In sub-bitstream extraction, the video coding device may take as inputs a bitstream, a target highest TemporalId value tIdTarget, and/or a target layer identifier list layerIdListTarget. In sub-bitstream extraction, the video coding device may output a sub-bitstream. For bitstream conformance for the input bitstream, a conforming bitstream may be an output sub-bitstream that has a target highest TemporalId value tIdTarget and a target layer identifier list layerIdListTarget. The target highest TemporalId value tIdTarget may, for example, be equal to any value in the range of 0 to 6, inclusive. The target layer identifier list layerIdListTarget may, for example, be equal to the layer identifier list associated with a layer set specified in the active video parameter set. A conforming bitstream may include one or more coded slice segment NAL units with nuh_layer_id equal to 0 and TemporalId equal to 0.

A video coding device may be configured to derive the output sub-bitstream. The video coding device may derive output sub-bitstream, for example, by removing supplemental enhancement information (SEI) NAL units that have nuh_layer_id equal to 0 and that may include a non-nested buffering period SEI message, a non-nested picture timing SEI message, and/or a non-nested decoding unit information SEI message. The video coding device may derive output sub-bitstream, for example, by removing supplemental enhancement information (SEI) NAL units that may include a non-nested buffering period SEI message, a non-nested picture timing SEI message, and/or a non-nested decoding unit information SEI message. A video coding device may remove VCL NAL units, for example, if the layerIdListTarget does not include each of the values of nuh_layer_id in each NAL unit in the bitstream. A video coding device may remove VCL NAL units, for example, if tIdTarget is less than the greatest TemporalId in each NAL unit in the bitstream. A bitstream extractor may comprise appropriate non-nested buffering picture SEI messages, non-nested picture timing SEI messages, and/or non-nested decoding unit information SEI messages in the extracted sub-bitstream, for example, if the SEI messages applicable to the sub-bitstream are present as nested SEI messages in the original bitstream. A bitstream extractor may be a middle box. A bitstream extractor may be able to pass through layers requested by an end user. A video coding device, such as a decoder, may be configured to remove video coding layer (VCL) NAL units with TemporalId greater than tIdTarget or nuh_layer_id not among the values included in layerIdListTarget. A video coding device, such as a decoder, may be configured to retain non-VCL NAL units, such as SPS and PPS. A video coding device, such as a decoder, may retain non-VCL NAL units even though the nuh_layer_id of non_VLC NAL units may be excluded from layerIdListTarget. Retaining the non-VCL NAL units may ensure that SPS and/or PPS may be available after sub-bitstream extraction for the layers the non-VCL NAL activates. A video coding device may remove VCL NAL units with TemporalId greater than tIdTarget or nuh_layer_id not among the values included in layerIdListTarget during the sub-bitstream extraction.

Table 5 illustrates an example of dependency signaling. Layer dependency (e.g., direct_dependency_flag) and layer dependency type (direct_dependency_type) may be signaled as part of the VPS extension separately.

TABLE 5

Dependency signaling in VPS extension

| vps_extension( ) { | Descriptor |
|---|---|
| ... | ... |
|   for( i = 1; i <= vps_max_layers_minus1; i++ ) | |
|     for( j = 0; j < i; j++ ) | |
|       direct_dependency_flag[ i ][ j ] | u(1) |
| ... | ... |
|   direct_dep_type_len_minus2 | ue(v) |
|   for( i = 1; i <= vps_max_layers_minus1; i++ ) | |
|     for( j = 0; j < i; j++ ) | |
|       if( direct_dependency_flag[ i ][ j ] ) | |
|         direct_dependency_type[ i ][ j ] | u(v) |
| ... | ... |
| } | |

A video coding device, such as an encoder, may be configured to set the value of a syntax element. For example, the video coding device may set the value of a syntax element in order to indicate information to a decoder.

If a syntax element direct_dependency_flag[i][j] is equal to 0, the layer with index j may not be a direct reference layer for the layer with index i. If direct_dependency_flag[i][j] is equal to 1, the layer with index j may be a direct reference layer for the layer with index i. When direct_dependency_flag[i][j] is not present for i and j in the range of 0 to vps_max_layers_minus1, direct_dependency_flag[i][j] may be inferred to be equal to 0.

A syntax element direct_dep_type_len_minus2 plus 2 may specify the number of bits of the direct_dependency_type[i][j] syntax element. In bitstreams, the value of direct_dep_type_len_minus2 may be equal to 0. Decoders may allow other values of direct_dep_type_len_minus2 in the range of 0 to 30, inclusive, to appear in the syntax.

A video coding device may be configured to utilize a syntax element to indicate information. For example, a syntax element direct_dependency_type[i][j] may indicate the type of dependency between the layer with nuh_layer_id equal to layer_id_in_nuh[i] and the layer with nuh_layer_id equal to layer_id_in_nuh[j]. direct_dependency_type[i][j] equal to 0 may indicate that the layer with nuh_layer_id equal to layer_id_in_nuh[i] may be used for inter-layer sample prediction. direct_dependency_type[i][j] equal to 0 may indicate that the layer with nuh_layer_id equal to layer_id_in_nuh[j] may be excluded in inter-layer motion prediction of the layer with nuh_layer_id equal to layer_id_in_nuh[i]. direct_dependency_type[i][j] equal to 1 may indicate that the layer with nuh_layer_id equal to layer_id_in_nuh[j] may be used for inter-layer motion prediction. direct_dependency_type[i][j] equal to 1 may indicate that the layer with nuh_layer_id equal to layer_id_in_nuh[j] may be excluded in inter-layer sample prediction of the layer with nuh_layer_id equal to layer_id_in_nuh[i]. direct_dependency_type[i][j] equal to 2 may indicate that the layer with nuh_layer_id equal to layer_id_in_nuh[j] may be used for both inter-layer sample motion prediction and inter-layer motion prediction of the layer with nuh_layer_id equal to layer_id_in_nuh[i]. Although the value of direct_dependency_type[i][j] may be in the range of 0 to 2, inclusive, decoders may allow values of direct_dependency_type[i][j] in the range of 3 to $2^{32}-2$, inclusive, to appear in the syntax.

A video coding device, such as the video coding device illustrated in FIG. 1, the video encoder illustrated in FIG. 3 and/or the video decoder illustrated in FIG. 3, may use a syntax element to indicate which layer is the direct dependent layer of each enhancement layer and the type of inter-layer prediction each direct dependent layer may support. For example, the syntax elements direct_dependency_flag[i][j], direct_dep_type_len_minus2, and direct_dependency_type[i][j] may be used by the video coding device to indicate which layer is the direct dependent layer of each enhancement layer and the type of inter-layer prediction each direct dependent layer may support.

For example, the video coding device, such as an encoder, may be configured to set the syntax elements direct_dependency_flag[i][j], direct_dep_type_len_minus2, and direct_dependency_type[i][j] to indicate which layer is the direct dependent layer of each enhancement layer and the type of inter-layer prediction each direct dependent layer may support. For example, a video coding device, such as a decoder, may be configured to use the syntax elements direct_dependency_flag[i][j], direct_dep_type_len_minus2, and direct_dependency_type[i][j] to determine which layer is the direct dependent layer of each enhancement layer and the type of inter-layer prediction each direct dependent layer may support.

SHVC may support inter-layer prediction types. For example, SHVC may support texture sample prediction and motion prediction. A video coding device may omit the syntax element direct_dep_type_len_minus2. A video coding device may change the descriptor of direct_dependency_type[i][j] from u(v) to u(2).

A video coding device, such as the video coding device illustrated in FIG. 1, the video encoder illustrated in FIG. 3 and/or the video decoder illustrated in FIG. 3, may indicate dependency between layers. The video coding device may use the layer dependency flag direct_dependency_flag and dependency type direct_dependency_type to indicate the dependency between two layers. For example, an encoder may be configured to use the layer dependency flag direct_dependency_flag and dependency type direct_dependency_type to indicate the dependency between two layers. For example, the decoder may be configured to use layer dependency flag direct_dependency_flag and dependency type direct_dependency_type to determine the dependency between two layers. The use of layer dependency flag direct_dependency_flag and dependency type direct_dependency_type to indicate the dependency between two layers may result in redundant signaling. The syntax elements direct_dependency_flag and direct_dependency_type may be merged into one syntax element, direct_dependency_type, with a descriptor ue(v), for example, as shown in Table 6. In Table 6, strikethrough text indicates syntax elements that may be omitted.

TABLE 6

Example dependency signaling in VPS extension

| vps_extension( ) { | Descriptor |
|---|---|
| ... | ... |
| ~~for( i = 1; i <= vps_max_layers_minus1; i++ )~~ | |
| ~~for( j = 0; j < i; j++ )~~ | |
| ~~direct_dependency_flag[i][j]~~ | ~~u(1)~~ |
| ~~...~~ | ~~....~~ |
| ~~direct_dep_type_len_minus2~~ | ~~ue(v)~~ |
| for( i = 1; i <= vps_max_layers_minus1; i++ ) | |
| for( j = 0; j < i; j++ ) | |
| ~~if( direct_dependency_flag[i][j] )~~ | |
| direct_dependency_type[ i ][ j ] | ue(v) |
| ... | ... |
| } | | may be a direct reference layer for the layer with nuh_layer_id equal to layer_id_in_nuh[i]. A video coding device may be configured to use the layer with nuh_layer_id equal to layer_id_in_nuh[j] for both inter-layer sample prediction and inter-layer motion prediction. If direct_dependency_type[i][j] is equal to 3, the layer with nuh_layer_id equal to layer_id_in_nuh[j] may be a direct reference layer for the layer with nuh_layer_id equal to layer_id_in_nuh[i]. A video coding device may be configured to use the layer with nuh_layer_id equal to layer_id_in_nuh[j] for inter-layer motion prediction. A video coding device may be configured to omit layer with nuh_layer_id equal to layer_id_in_nuh[j] in inter-layer sample prediction.

The variables NumDirectRefLayers[i]. RetLayerId[i][j] SamplePredEnabledFlag[i][j], MotionPredEnabledFlag[i][j], and DirectRefLayerIdx[i][j] may be derived as follows:

```
for( i = 0; i <= vps_max_layers_minus1; i++ ) {
  iNuhLId = layer_id_in_nuh[i]
  NumDirectRefLayers[ iNuhLId ] = 0
  for( j = 0; j < i; j++ )
    if( direct_dependency_type[i][j] ) {
      RefLayerId[ iNuhLId ][ NumDirectRefLayers[ iNuhLId ]++ ] = layer_id_in_nuh[j]
      SamplePredEnabledFlag[ iNuhLId ][ j ] = ( ( direct_dependency_type[i][j] == 1) || ( direct_dependency_type[i][j] == 2) )
      MotionPredEnabledFlag[ iNuhLId ][j] = ( ( direct_dependency_type[i][j] == 2) || ( direct_dependency_type[i][j] == 3) )
      DirectRefLayerIdx[ iNuhLid ][ layer_id_in_nuh[j] ] = NumDirectRefLayers[ iNuhLid ] - 1
    }
}
```

The syntax element direct_dependency_type may replace the syntax element direct_dependency_flag. A video coding device, such as the video coding system illustrated in FIG. 1, the video encoder illustrated in FIG. 3 and/or the video decoder illustrated in FIG. 3, may use syntax elements to indicate dependency between layers. The syntax element direct_dependency_type[i][j] may indicate the type of dependency between the layer with nuh_layer_id equal to layer_id_in_nuh[i] and the layer with nuh_layer_id equal to layer_id_in_nuh[j]. For example, the encoder may be configured to set the syntax element direct_dependency_type[i][j] to indicate the type of dependency between the layer with nuh_layer_id equal to layer_id_in_nuh[i] and the layer with nuh_layer_id equal to layer_id_in_nuh[j]. For example, the decoder may be configured to use the syntax element direct_dependency_type[i][j] to determine the type of dependency between the layer with nuh_layer_id equal to layer_id_in_nuh[i] and the layer with nuh_layer_id equal to layer_id_in_nuh[j].

For example, if direct_dependency_type[i][j] is equal to 0, the layer with nuh_layer_id equal to layer_id_in_nuh[j] may not be a direct reference layer for the layer with nuh_layer_id equal to layer_id_in_nuh[i]. If direct_dependency_type[i][j] is equal to 1, the layer with nuh_layer_id equal to layer_id_in_nuh[j] may be a direct reference layer for the layer with nuh_layer_id equal to layer_id_in_nuh[i]. A video coding device may be configured to use the layer with nuh_layer_id equal to layer_id_in_nuh[j] for inter-layer sample prediction. If direct_dependency_type[i][j] equal to 2, the layer with nuh_layer_id equal to layer_id_in_nuh[j]

A video coding device, such as the video coding system illustrated in FIG. 1, the video encoder illustrated in FIG. 3 and/or the video decoder illustrated in FIG. 3, may use a dependent layer to provide inter-layer motion prediction. A video coding device may omit a dependent layer when providing inter-layer sample prediction. Inter-layer sample prediction may contribute significantly more to coding performance gain than inter-layer motion prediction (e.g., approximately 25-30% for inter-layer sample prediction compared with approximately 1% for inter-layer motion prediction). Inter-layer sample prediction may be used as a base form of inter-layer prediction and allow inter-layer motion prediction as a possible addition. For example, inter-layer motion prediction may be allowed when inter-layer sample prediction is allowed. A constraint for a direct dependent layer to support inter-layer sample prediction may be applied to an SHVC main profile.

The layer dependency signaling in VPS extension may be modified as shown in Table 7. In Table 7, strikethrough text indicates syntax elements that may be omitted. The syntax structure may be consolidated as shown in Table 8.

TABLE 7

Example motion prediction flag in VPS extension

| vps_extension( ) { | Descriptor |
|---|---|
| ... | ... |
| for( i = 1; i <= vps_max_layers_minus1; i++ ) | |
| for( j = 0; j < i; j++ ) | |
| direct_dependency_flag[i][j] | u(1) |

TABLE 7-continued

Example motion prediction flag in VPS extension

| vps_extension( ) { | Descriptor |
|---|---|
| ... | |
|   for( i = 1; i <= vps_max_layers_minus1; i++ ) | |
|     for( j = 0; j < i; j++ ) | |
|       if( direct_dependency_flag[i][j] ) | |
|         ~~direct_dependency_type[i][j]~~ | ~~u(v)~~ |
|         il_motion_prediction_flag[i][j] | u(1) |
| ... | ... |
| } | |

TABLE 8

Example motion prediction flag in VPS extension

| vps_extension( ) { | Descriptor |
|---|---|
| ... | ... |
|   for( i = 1; i <= vps_max_layers_minus1; i++ ) | |
|     for( j = 0; j < i; j++ ) | |
|       direct_dependency_flag[i][j] | u(1) |
|       if( direct_dependency_flag[i][j] ) | |
|         il_motion_prediction_flag[i][j] | u(1) |
| ... | ... |
| } | |

As shown in Tables 7 and 8, the syntax element direct_dependency_type may be replaced by a syntax element il_motion_prediction_flag. The semantics of direct_dependency_flag and il_motion_prediction_flag may be as disclosed herein.

If direct_dependency_flag[i][j] is equal to 0, the layer with index j may not be a direct reference layer for the layer with index i. If direct_dependency_flag[i][j] is equal to 1, the layer with index j may be a direct reference layer for the layer with index i. A video coding device may use the layer with its nuh_layer_id equal to layer_id_in_nuh[j] inter-layer sample prediction. When direct_dependency_flag[i][j] is absent for i and j in the range of 0 to vps_max_layers_minus1, direct_dependency_flag[i][j] may be inferred to be equal to 0.

The variables NumDirectRefLayers[i]. RefLayerId[i][j], SamplePredEnabledFlag[i][j], MotionPredEnabledFlag[i][j], and DirectRefLayerIdx[i][j] may be derived as follows:

```
for( i = 0; i <= vps_max_layers_minus1; i++ ) {
  iNuhLId = layer_id_in_nuh[i]
  NumDirectRefLayers[ iNuhLId ] = 0
  for( j = 0; j < i; j++ )
    if( direct_dependency_flag[i][j] ) {
      RefLayerId[ iNuhLId ][ NumDirectRefLayers[ iNuhLId ]++ ] = layer_id_in_nuh[j]
      SamplePredEnabledFlag[ iNuhLId ][j] = 1
      MotionPredEnabledFlag[ iNuhLId ][j] = il_motion_prediction_flag[i][j]
      DirectRefLayerId[ iNuhLid ][ layer_id_in_nuh[j] ] = NumDirectRefLayers[ iNuhLid ] - 1
    }
}
```

If il_motion_prediction_flag[i][j] is equal to 0, a video coding device may exclude the layer with nuh_layer_id equal to layer_id_in_nuh[j] for inter-layer motion prediction of the layer with nuh_layer_id equal to layer_id_in_nuh[i]. If il_motion_prediction_flag[i][j] is equal to 1, a video coding device may use the layer with nuh_layer_id equal to layer_id_in_nuh[i] for inter-layer motion prediction of the layer with nuh_layer_id equal to layer_id_in_nuh[i]. When il_motion_prediction_flag[i][j] is absent for i and j in the range of 0 to vps_max_layers_minus1, a video coding device may infer il_motion_prediction_flag[i][j] to be equal to 0.

In an example SHVC bitstream, a video coding device may enable inter-layer sample prediction and/or inter-layer motion prediction for one or more or all direct dependent layers. The video coding device may bypass the signaling of direct_dependency_type for one or more (e.g., each) individual dependent layer. For example, an encoder may use a gating flag, default_all_ilp_enable_flag as shown in Table 9, to indicate the signaling of direct_dependency_type for each individual dependent layer may be bypassed. For example, a decoder may use a gating flag, default_all_ilp_enable_flag, to determine if the signaling of direct_dependency_type for each individual dependent layer may be bypassed.

TABLE 9

Example gating flag in VPS extension

| vps_extension( ) { | Descriptor |
|---|---|
| ... | ... |
|   default_all_ilp_enable_flag | u(1) |
|   if (!default_all_ilp_enable_flag) { | |
|     for( i = 1; i <= vps_max_layers_minus1; i++ ) | |
|       for( j = 0; j < i; j++ ) | |
|         if( direct_dependency_flag[ i ][ j ] ) | |
|           direct_dependency_type[ i ][ j ] | u(2) |
|   } | |
| ... | ... |
| } | |

If default_all_ilp_enable_flag is equal to 1, a video coding device may use the direct dependent layers (e.g., all direct dependent layers) of the layer with nuh_layer_id equal to iNuhLId for inter-layer sample prediction and inter-layer motion prediction for the layer with nuh_layer_id equal to iNuhLId. If default_all_ilp_enable_flag is equal to 0, a video coding device may use or may exclude the direct dependent layers (e.g., all direct dependent layers) of the layer with nuh_layer_id equal to iNuhLId for inter-layer sample prediction and inter-layer motion prediction for the layer with nuh_layer_id equal to iNuhLId.

A video coding device may determine whether to include direct dependency type information in the VPS. If the video coding device decides to use default dependencies, the video coding device may bypass signaling the direct dependency type information in the VPS. If the video coding device decides not to use default dependencies, the video coding device may include the direct dependency type information in the VPS. The video coding device may set a default direct dependency flag in the VPS.

A video coding device may be configured to signal a dependency type presence flag. e.g., direct_dependency_type_presence_flag. A video coding device may be configured to set the direct_dependency_type_presence_flag. A video coding device may be configured to signal the direct_dependency_type[i][j] in the VPS extension. A video coding device may be configured to set the direct_dependency_type_presence_flag in order to signal the direct_dependency_type[i][j]. When direct_dependency_type_presence_flag is set equal to 1, a video coding device may explicitly signal the syntax element direct_dependency_type[i][j] in VPS extension. The syntax element direct_dependency_type[i][j] may not be present in the VPS extension.

A video coding device may receive a video bitstream including a video parameter set (VPS) and one or more of layers. A video coding device may determine direct dependency relations associated with one or more of the layers, for example, based on a default direct dependency flag in the VPS. If the default direct dependency flag indicates direct dependency type information is present in the VPS, the video coding device may determine the direct dependency relations from the direct dependency type information in the VPS. If the default direct dependency flag indicates the direct dependency type information is absent in the VPS, the video coding device may determine the direct dependency relations based on a default. The default dependency may apply to all layers in the plurality of layers.

A video coding device may infer the values of SamplePredEnabledFlag and MotionPredEnabledFlag. A video coding device may be configured to infer the values of SamplePredEnabledFlag and MotionPredEnabledFlag. For example, both SamplePredEnabledFlag[i][j] and MotionPredEnabledFlag[i][j] of each $j^{th}$ dependent layer of the $i^{th}$ enhancement layer may be inferred to be 1 by default.

The syntax element direct_dependency_type[i][j] may indicate the type of dependency between the layer with nuh_layer_id equal to layer_id_in_nuh[i] and the layer with nuh_layer_id equal to layer_id_in_nuh[j]. A video coding device, such as an encoder, may be configured to set the syntax element direct_dependency_type[i][j] to indicate the type of dependency between the layer with nuh_layer_id equal to layer_id_in_nuh[i] and the layer with nuh_layer_id equal to layer_id_in_nuh[j]. If direct_dependency_type[i][j] is equal to 0, the video coding device may use the layer with nuh_layer_id equal to layer_id_in_nuh[j] for inter-layer sample prediction. If direct_dependency_type[i][j] is equal to 0, the video coding device may use the layer with nuh_layer_id equal to layer_id_in_nuh[j] for inter-layer motion prediction of the layer with nuh_layer_id equal to layer_id_in_nuh[i]. If direct_dependency_type[i][j] is equal to 1, the video coding device may be configured to use the layer with nuh_layer_id equal to layer_id_in_nuh[i] for inter-layer motion prediction. If direct_dependency_type[i][j] is equal to 1, the video coding device may use the layer with nuh_layer_id equal to layer_id_in_nuh[j] for inter-layer sample prediction of the layer with nuh_layer_id equal to layer_id_in_nuh[i]. If direct_dependency_type[i][j] is equal to 2, the video coding device may be configured to use the layer with nuh_layer_id equal to layer_id_in_nuh[j] for both inter-layer sample motion prediction and inter-layer motion prediction of the layer with nuh_layer_id equal to layer_id_in_nuh[i].

The video coding device may assign a representation format for a layer associated with an SPS. The VPS may include a list of video representation formats. For example, a video coding device, such as an encoder, may be configured to signal video representation formats (e.g., rep_format( ) shown in Table 10) into a lookup list in the VPS extension. Corresponding indices, e.g., vps_rep_format_idx[i] shown in Table 11 into the list of rep_format( ), may be specified for a layer (e.g., each layer) in the VPS.

For example, if the rep_format( ) of a particular layer does not match the predefined rep_format( ) specified in the VPS extension, a video coding device, such as an encoder, may be configured to set an updated flag, update_rep_format_flag as shown in Table 12, in the SPS. If the rep_format( ) of a particular layer does not match the predefined rep_format( ) specified in the VPS extension, a video coding device, such as an encoder, may be configured to signal (e.g., explicitly signal) a syntax element (e.g., every syntax element) of rep_format( ) in the SPS.

TABLE 10

Example representation format syntax

| rep_format( ) { | Descriptor |
|---|---|
| chroma_format_vps_idc | u(2) |
| if( chrome_format_vps_idc = = 3 ) | |
| separate_colour_plane_vps_flag | u(1) |
| pic_width_vps_in_luma_samples | u(16) |
| pic_height_vps_in_luma_samples | u(16) |
| bit_depth_vps_luma_minus8 | u(4) |
| bit_dept_vps_chroma_minus8 | u(4) |
| } | |

TABLE 11

Example rep_format( ) in VPS

| vps_extension( ) { | Descriptor |
|---|---|
| .... | |
| rep_format_idx_present_flag | u(1) |
| if( rep_format_idx_present_flag ) | |
| vps_num_rep_formats_minus1 | u(4) |
| for( i = 0; i <= vps_num_rep_formats_minus1; i++ ) | |
| rep_format( ) | |
| if( rep_format_idx_present_flag ) | |
| for( i = 1; i <= vps_max_layers_minus1; i++ ) | |
| if( vps_num_rep_formats_minus1 > 0 ) | |
| vps_rep_format_idx[i] | u(4) |
| .... | |
| } | |

TABLE 12

Example representation format update syntax elements in SPS

| seq_parameter_set_rbsp( ) { | Descriptor |
|---|---|
| ... | ue(v) |
| if( nuh_layer_id > 0 ) | |
| update_rep_format_flag | u(1) |
| if( update_rep_format_flag ) { | |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| } | |
| .... | u(1) |
| } | |

The video coding device may determine whether to include a representation format index in the SPS, for example, based on the assigned representation format for the layer associated with the SPS. The representation format index may not be included in the SPS, for example, if the assigned representation format is a default representation format. The representation format index may be included in the SPS, for example, if the assigned representation format is specified in the VPS.

A video coding device, such as the video coding system illustrated in FIG. 1, the video encoder illustrated in FIG. 3 and/or the video decoder illustrated in FIG. 3, may specify information to the syntax structures in the VPS. For example, syntax elements, e.g., update_rep_format_idx_present_flag and update_rep_format_idx, may specify the index into the list of rep_format( ) syntax structures in the VPS. If a representation format matches a rep_format( ) list signaled in the VPS, index of the list of rep_format( ) may be signaled. Syntax elements may specify the index into the list of rep_format( ) syntax structures in the VPS. Table 13 illustrates example syntax elements in SPS.

TABLE 13

Example Representation Format Update Syntax Elements in SPS

| seq_parameter_set_rbsp( ) { | Descriptor |
|---|---|
| ... | ue(v) |
| if( nuh_layer_id > 0 ) | |
|   update_rep_format_flag | u(1) |
|   if( update_rep_format_flag ) { | |
|     update_rep_format_idx_present_flag | u(1) |
|     if (update_rep_format_idx_present_flag) | |
|       update_rep_format_idx | u(4) |
|     else { | |
|       chroma_format_idc | ue(v) |
|       if( chroma_format_idc = = 3 ) | |
|         separate_colour_plane_flag | u(1) |
|       pic_width_in_luma_samples | ue(v) |
|       pic_height_in_luna_samples | ue(v) |
|     } | |
|   } | |
| .... | u(1) |
| } | |

The video coding device may set an update video representation format flag to indicate whether the representation format index is included in the SPS. For example, if update_rep_format_idx_present_flag is equal to 1, the syntax element update_rep_format_idx may be present. If update_rep_format_idx_present_flag is equal to 0, the syntax element update_rep_format_idx may be absent.

The syntax element update_rep_format_idx may specify the index into the list of rep_format( ) syntax structures in the VPS of the rep_format( ) syntax structure. When absent, the value of update_rep_format_idx may be inferred to be equal to 0. The value of update_rep_format_idx may be in the range of 0 to vps_num_rep_formats_minus1, inclusive.

The video coding device may determine a video representation format for a layer associated with an SPS, for example, based on an update video representation format flag in the SPS. If the update video representation format flag indicates a presence of a representation format index, the video representation format may be determined from the list of video representation formats in the VPS based on the representation format index. If the update representation format index is absent, the video representation format may be determined from a default video representation format. The video coding device may determine whether the representation format index is present in the SPS, for example, based on the update video representation format flag in the SPS. If the update video representation format flag equals 1, the video coding device may determine that the representation format index is present in the SPS. If the update video representation format flag equals 0, the video coding device may determine that the representation format index is absent in the SPS. The default video representation format may be a default video representation format specified in the VPS for the layer. The video update representation format index may be in a range between 0 and the value of the VPS number representation formats minus 1, inclusive.

Syntax elements in the VPS extension and slice header may be inferred from values of other syntax elements. Conditioning on the signaling of syntax elements may save overhead.

A video coding device, such as an encoder, may be configured to signal a syntax element max_one_active_ref_layer_flag in the video parameter set (VPS) extension to specify if, for each picture in the current enhancement layer, a single picture from one dependent layer may be used for inter-layer prediction. Pictures from different dependent layers may be used for inter-layer prediction, for example, for different pictures in the current enhancement layers. The syntax element in the same VPS extension, all_ref_layers_active_flag, may specify that for each picture in the current enhancement layer, the reference pictures of its direct dependent layers available in current access units may be used for inter-layer prediction when the value of all_ref_layers_active_flag is equal to 1.

A video coding device, such as an encoder, may be configured to set the value of all_ref_layers_active_flag. When all_ref_layers_active_flag is set equal to 1, a video coding device, such as a decoder may be configured to infer the value of max_one_active_ref_layer_flag from the maximum value of NumDirectRefLayers[i], for example, when i is in the range of 1 to the maximum number of layers.

Table 14 illustrates an example syntax conditioning in a VPS extension.

TABLE 14

Example conditioning on max_one_active_ref_layer_flag in VPS extension

| vps_extension( ) { | Descriptor |
|---|---|
| ... | ... |
|   all_ref_layers_active_flag | u(1) |
| ... | |
|   if (!all_ref_layers_active_flag) | |
|     max_one_active_ref_layer_flag | u(1) |
| ... | ... |
| } | |

A variable MaxNumDirectDependentRefLayers may represent the maximum number of direct dependent reference layers of the enhancement layers. The variable MaxNumDirectDependentRefLayers may be derived as follows:

```
MaxNumDirectDependentRefLayers = 0
for (i=0; I <= vps_max_layers_minus1; i++) {
   if (MaxNumDirectDependentRefLayers < NumDirectRefLayers[i])
      MaxNumDirectDependentRefLayers = NumDirectRefLayers[i])
}
```

A video coding device, such as an encoder, may be configured to set the value of max_one_active_ref_layer_flag. If max_one_active_ref_layer_flag is equal to 1, a video coding device, such as a decoder, may be configured to use at most one picture for inter-layer prediction for each picture in the CVS. If max_one_active_ref_layer_flag is equal to 0, a video coding device, such as a decoder, may be configured to use more than one picture for inter-layer prediction for each picture in the CVS. If max_one_active_ref_layer_flag is absent, max_one_active_ref_layer_flag may be derived as follows:

max_one_active_ref_layer_flag=(MaxNumDirectDependentRefLayers>1)?0:1

A video coding device, such as a video encoder, may signal the syntax element slice_pic_order_cnt_lsb in the slice header for a non-IDR slice to specify the LSB of picture order count for the current picture. The syntax element may be signaled for the enhancement layers regardless of the picture type. For example, a video coding device, such as a video encoder, may be configured to signal the syntax element for the enhancement layers regardless of the picture type. The video coding device, such as the encoder, may use the syntax element to align the POC value for the pictures within the same or similar access unit when an intra random access point (IRAP) picture is misaligned across the layers. When the IRAP picture across the layers are aligned, it may be redundant to signal slice_pic_order_cnt_lsb for IDR picture, for example, since the POC value of IDR picture may be zero. The video coding device, such as the video encoder, may be configured to signal the syntax element cross_layer_irap_aligned_flag in VPS to indicate whether the IRAP picture is aligned across different layers.

If cross_layer_irap_aligned_flag is equal to 1, IRAP pictures in the CVS may be cross-layer aligned, for example, when a picture pictureA of a layer layerA in an access unit is an IRAP picture. A picture pictureB in the same or similar access unit that may belong to a direct reference layer of layerA or that may belong to a layer for which layerA is a direct reference layer may be an IRAP picture. The VCL NAL units of pictureB may have the same or similar value of nal_unit_type as that of pictureA. If cross_layer_irap_aligned_flag is equal to 0, these relations may or may not apply.

The syntax element cross_layer_irap_aligned_flag may be used to condition signaling of slice_pic_order_cnt_lsb, as shown in Table 15.

TABLE 15

Example conditioning on slice_pic_order_cnt_lsb in slice header syntax

| slice_segment_header( ) { | Descriptor |
|---|---|
| ... | |
| if( (nuh_layer_id > 0 && !cross_layer_irap_aligned_flag ) \|\| ( nal_unit_type != IDR_W_RADL && nal_unit_type != | |

TABLE 15-continued

Example conditioning on slice_pic_order_cnt_lsb in slice header syntax

| slice_segment_header( ) { | Descriptor |
|---|---|
| IDR_N_LP ) ) { | |
|   slice_pic_order_cnt_lsb | u(v) |
| ... | |
| } | |

HEVC may be extended to support scalable coding. For example, HEVC may support spatial scalability, quality scalability, and standard scalability. Spatial scalability may be when the scalable bitstream contains signals that may be more than one spatial resolution. Quality scalability may be when the scalable bitstream contains signals at more than one quality level. Quality scalability may also be referred to as SNR scalability. Standard scalability may be when the scalable bitstream contains a base layer coded using H.264/AVC and one or more enhancement layers coded using HEVC. HEVC may support view scalability. View scalability may be when the scalable bitstream contains both 2D and 3D video signals.

The scalable extensions of HEVC (SHVC) may utilize a reference index base framework. SHVC may utilize a syntax, one or more semantics and/or one or more decoding processes.

A video coding device may utilize profiles to define a subset of algorithmic features, such as compression tools, video input format such as bit depth and chroma format, and/or the like. A video coding device may utilize levels and/or tiers to define a set of quantitative capabilities such as maximum bit rate, maximum frame size, maximum number of samples per second, and/or the like. A video coding device in H.265 and/or HEVC may utilize three profiles (e.g., a main profile, a main 10 profile, and a main still picture profile) and/or thirteen levels, for example, with one or more level having two tiers. A video coding device may utilize profile, level, and/or tier to specify the maximum complexity of a video coding device conforming to that profile, level, and/or tier.

The profile, tier and level may have a number of constraints (e.g., three constraints). The constraints may include one or more of the following. A video coding device, such as a video decoding device may not invoke picture resampling of picture sample values more than once for decoding of a particular picture. A video coding device may not invoke the resampling of a picture motion field more than once for decoding of a particular picture. When a video coding device may invoke both picture sample values and picture motion field resampling for decoding of a particular picture, a video coding device may apply picture sample values and/or picture motion field resampling to the same reference layer picture. When a DependencyId[i] may be equal to 1, a video coding device may set ScalabilityId [LayerIdxInVps [i]][smIdx] equal to 0 for a smIdx value from 0 to 15, inclusive, that may not be equal to 2, for a coded picture with nuh_layer_id equal to i. When avc_base_ layer_flag may be equal to 1, a video coding device may set MotionPredEnabledFlag[iNuhLId][0] equal to 0 for iNuhLId equal to a value of nuh_layer_id present in the bitstream, for example, for bitstream conformance.

A video coding device may use a scalable main profile to specify that a picture texture resampling and motion resampling may not be invoked more than once when decoding a picture. For example, each of the inter-layer sample prediction and the inter-layer motion prediction for spatial scalability may be from one reference layer. A video coding device may use the same reference layer, for example, when both inter-layer sample prediction and motion prediction are enabled.

A video coding device may specify a constraint, such as a current constraint, at the picture level. The bit length of layer_id in the NAL unit header may be 6-bit. A 6-bit length layer_id in the NAL unit header may allow and/or enable a maximum of 64 layers. Up to 63 direct dependent layers may exist at the bitstream or the coded video sequence (CVS) level, for example, if a video coding device uses one of the reference layers for sample and/or motion prediction for one or more coded picture in the bitstream. A direct dependent layer may be a layer including at least one picture that may be used as reference picture for inter-layer sample and/or motion prediction for a particular enhancement layer picture.

A video coding device may restrict and/or reduce a coding complexity for a multi-loop SHVC codec, for example, by signaling one or more constraints to limit a number of layers for a SHVC profile and applying the one or more constraints. The layers may be direct dependent layers, indirect dependent layers, and/or a base layer. One or more constraints may be, for example, limiting a maximum number of the direct dependent layers or limiting a maximum number of direct and indirect dependent layers. The video coding device may limit the maximum number of direct dependent layers via at least one of a syntax element in a VPS extension, a syntax element in an SPS, a profile indication, and/or in accordance with a profile, tier, and/or level (e.g., a scalable main profile). The video coding device may limit the maximum number of direct and indirect dependent layers via at least one of a syntax element in a VPS extension, a syntax element in an SPS, a profile indication, and/or according to a profile, tier, and/or level (e.g., a scalable main profile). A constraint may be a constraint on the base layer. The constraint on the base layer may use a conforming SHVC bitstream. The conforming SHVC bitstream may be one or more access units, for example, including a picture with its nuh_layer_id equal to 0 and TemporalId equal to 0. A layer including the picture with nuh_layer_id equal to 0 and TemporalId equal to 0 may be the direct or indirect dependent layer of the layer for each nuh_layer_id value in a layer identifier list, TargetDecLayerIdList. The video coding device may signal one or more constraints via a derived variable. The video coding device may signal one or more constraints via a syntax element.

Figure 6:
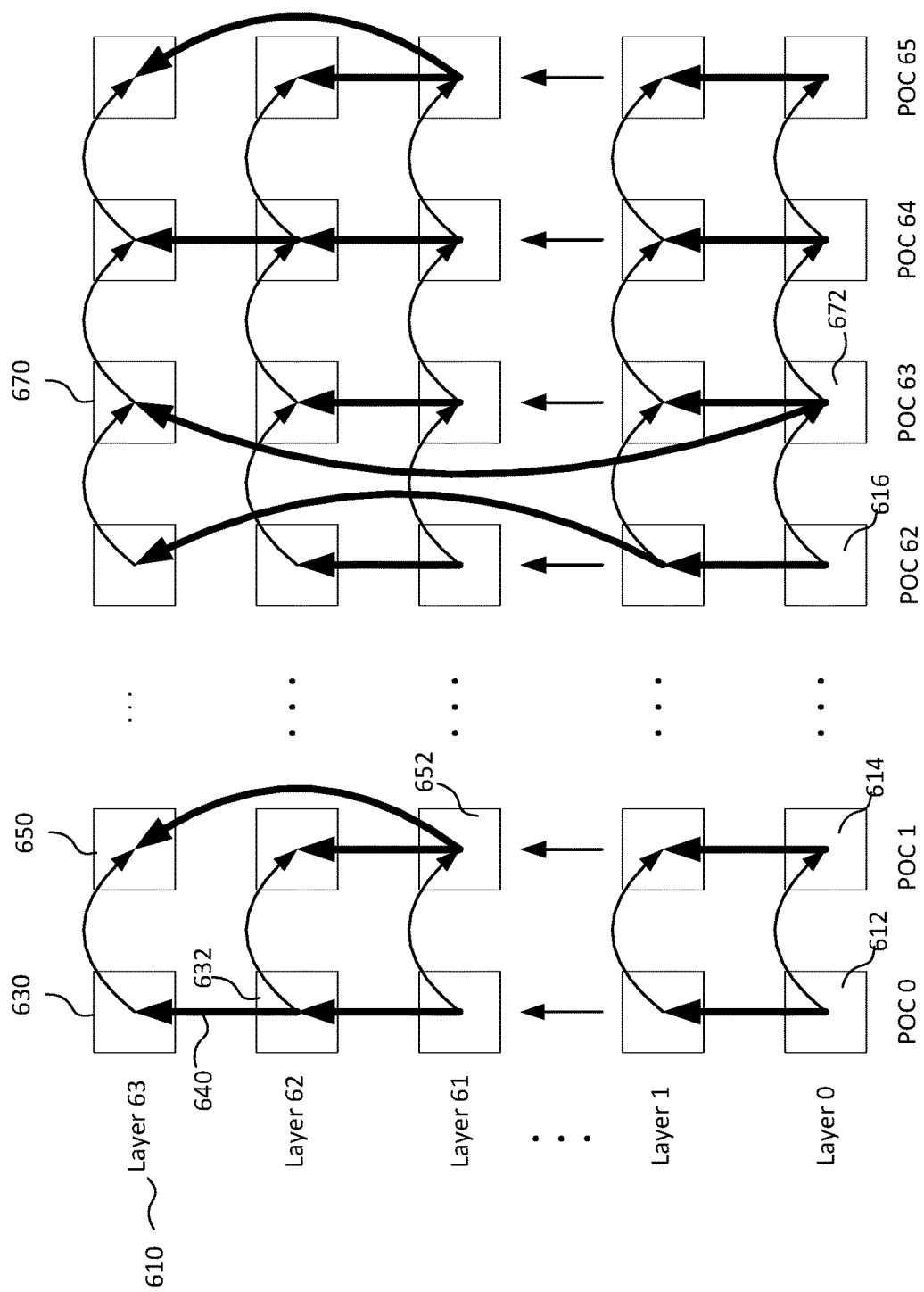
FIG. 6 illustrates an example multiple layer prediction structure.

FIG. 6 illustrates an example of multiple layer prediction structure. In FIG. 6, the top layer, layer-63 610, may have up to 63 direct dependent layers within a video sequence. A video coding device may be configured to choose a reference picture from one of 63 reference layers for each picture of layer-63 610 for inter-layer sample and motion prediction, for example, to fulfill an SHVC main profile constraint. For instance, a video coding device may use POC-0 picture from layer-62 632 for inter-layer prediction (e.g., as shown by arrow 640) for POC-0 picture of layer-63 630. A video coding device may use POC-1 picture from layer-61 652 for inter-layer prediction for picture POC-1 614 of layer-63 650, etc. Restricting the implementation complexity may not be accomplished with current constraints, for example, because the reference pictures of direct reference layers may be required to be decoded, for example, unless it may be determined that such a layer may not be used for both inter-layer prediction and temporal prediction within its own layer. The number of inter-layer motion prediction and sample prediction operation to restrict implementation complexity may be limited. The reference picture of a direct or indirect dependent layer may be decoded. A video coding device may decode the reference picture of a direct or indirect dependent layer, for example, by inter-layer prediction and/or sample prediction. A video coding device may not decode one or more pictures of the direct or indirect dependent layers, for example, if the one or more pictures are not reference pictures for temporal and/or inter-layer prediction. For example, a video coding device may have to decode pictures with POC 0 612, 1 614, . . . 62 616 of layer-0 to decode the picture with POC 63 in layer-0 672, for example, if the picture with POC 63 in layer-63 670, directly depends on picture with POC 63 in layer-0 672 for inter layer prediction.

A multi-loop SHVC encoder may have a processor with executable instructions for limiting the number of reference layers for a profile. The multi-loop SHVC encoder may set a reference layer limit. The multi-loop SHVC encoder may encode a video signal into layers for the profile such that the layers comprise direct and indirect reference layers and the total number of direct and indirect reference layers for a layer in the encoded video signal are less than the reference layer limit.

Figure 7:
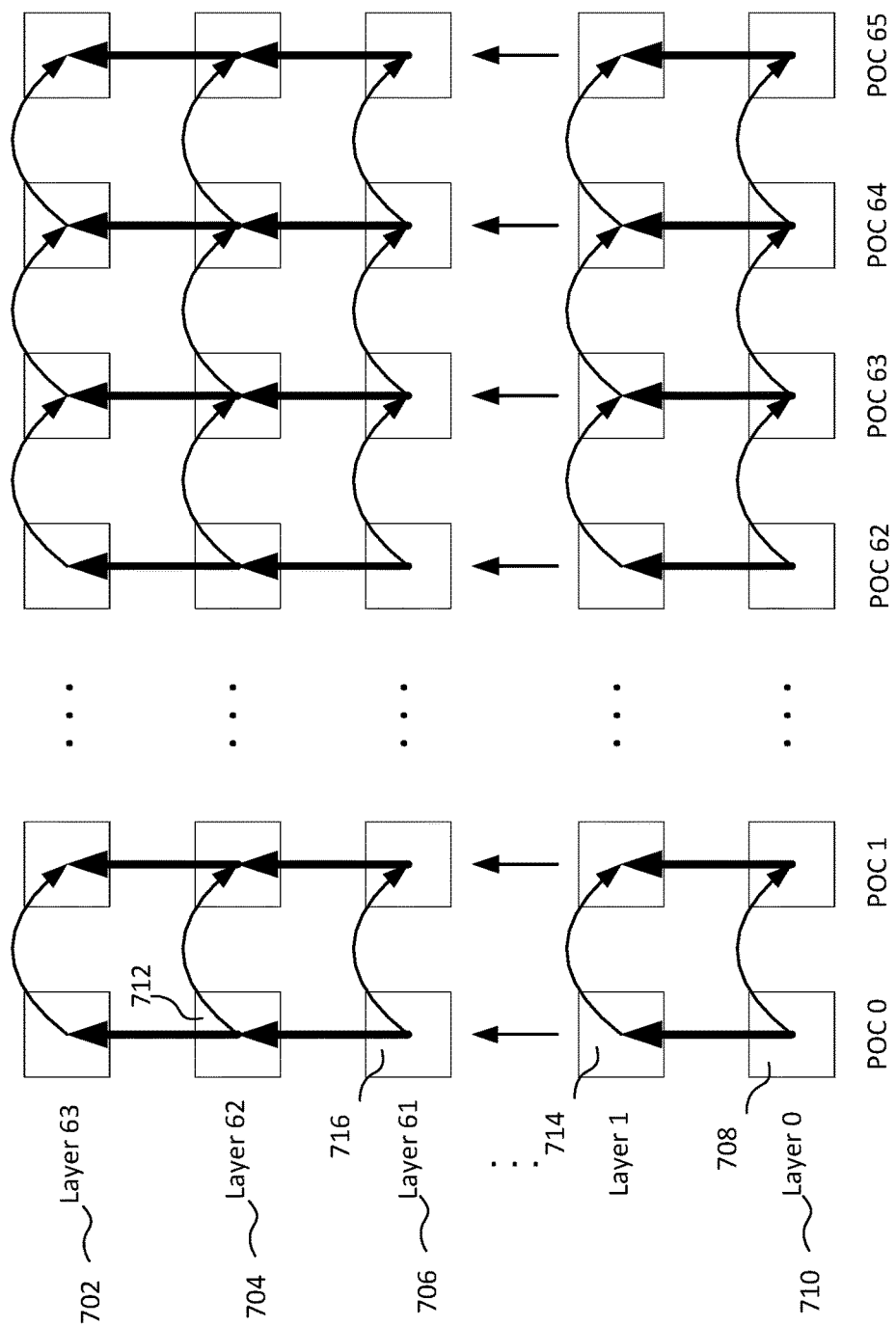
FIG. 7 illustrates an example indirect dependent layer.

FIG. 7 illustrates an example indirect dependent layer. The number of indirect dependent layers may impact the complexity of the SHVC codec implementation. An indirect dependent layer may be a layer containing at least one picture that may be used as a reference picture for inter-layer sample and/or motion prediction for a picture of a direct dependent layer of a particular enhancement layer. As shown in FIG. 7, layer-63 702 may have one direct dependent layer, layer-62 704, within a video sequence. A video coding device may predict one or more coding pictures in layer-63 702 from the co-located reference picture of layer-62 712. Layer-63 702 may have up to 62 indirect dependent layers as shown in FIG. 7. In FIG. 7, one or more or each layer may depend on its next lower layer as the reference layer, e.g. layer-63 702 directly depends on layer-62 704, and the layer-62 704 directly depends on layer-61 706, etc. To correctly decode the pictures of layer-63, a video coding device may have to correctly decode collocated pictures 708, 714, 716, 712 from layer-0 710 to layer 62 704. The number of indirect dependent layers may impact the total amount of memory required for a SHVC coding system. The number of indirect dependent layers may impact the error resilience capability of the system. A constraint on the number of direct and/or indirect dependent layers may be critical to specify the maximum implementation complexity of an SHVC codec.

A multi-loop SHVC encoder may have a processor with executable instructions for limiting the number of reference layers for a profile. The multi-loop SHVC encoder may set a reference layer limit. The multi-loop SHVC encoder may encode a video signal into layers for the profile that comprise direct and indirect layers. For each layer, the multi-loop SHVC encoder may determine the total number of direct and indirect reference layers. The multi-loop SHVC encoder may determine whether the total number of direct and indirect reference layers for the layer is less than the reference layer limit. The multi-loop SHVC encoder may send the encoded video signal to a decoder, for example, if the total number of direct and indirect reference layers for each layer is less than the reference layer limit.

The SHVC main profile constraint may limit the number of sample and/or motion resampling processes to restrict the number of inter-layer reference pictures available at the picture level. In SNR scalability, a video coding device may not use a sample or motion resampling process. In SNR scalability, a video coding device may follow multi-loop decoding architecture. In SNR scalability, a video coding device may use dependent layers (e.g., direct and indirect) to be decoded to decode a given enhancement layer. The constraint on the number of dependent layers may be applied to SNR scalability.

A SHVC video coding device, such as a video decoding device, may be able to decode 64 layers of bitstream completely. Decoding 64 layers of bitstream may be equivalent to having 64 single-layer decoders in the SHVC decoder. A video coding device may add profile constraints to limit the SHVC decoder complexity.

In an example, a main profile constraint may be provided on the number of dependent layers. For example, to restrict the coding complexity for multi-loop SHVC codec, further constraints may be provided to limit the number of direct and indirect dependent layers for SHVC main profile and its levels as follows.

The number of direct dependent layers of the layer with nuh_layer_id equal to iNuhLId, NumDirectRefLayers[iNuhLId] may be predetermined. A video coding device may derive the number of indirect dependent layers of the layer with nuh_layer_id equal to iNuhLId, NumIndirectRefLayers[iNuhLId] as follows:

A video coding device may determine the total number of direct and indirect dependent layers of the layer with nuh_layer_id equal to iNuhLId, NumRefLayers[iNuhLId] by summing NumDirectRefLayers[iNuhLId] and NumIndirectRefLayers[iNuhLId]. For example, NumRefLayers[iNuhLId]=NumDirectRefLayers[iNuhLId]+NumIndirectRefLayers[iNuhLId].

A video coding device may use a constraint on the number of direct dependent layers. For example, a video coding device may use a constraint option to limit the maximum number of direct dependent layers in the main profile. A video coding device may signal a syntax element, max_num_direct_dependent_ref_layers_minus1, in VPS extension or SPS to restrict the maximum value of total number of direct dependent reference layers available for one or more or each enhancement layer in the SHVC main profile. A video coding device may set the variable NumDirectRefLayers[i], where i may be in the range from 1 to the maximum number of layers (e.g., 63), equal to or less than the value of max_num_direct_dependent_ref_layers_minus1. The total number of layers that a video coding device may decode in order to decode a particular layer may be up to 63, for example, since each dependent layer may rely on one or more its own dependent layers to be decoded.

A video coding device may utilize a constraint for a scalable main profile. For example, the number of direct dependent layers of a particular enhancement layer with nuh_layer_id equal to iNuhLId, NumDirectRefLayers[iNuhLId], may not exceed N where N may be the maximum number of direct dependent layers that may be allowed by a scalable main profile. A video coding device may set the maximum number of direct dependent layers, N, equal to 1 for a SHVC Main Profile.

```
for ( i = 0; i <= vps_max_layers_minus1 ; i++ ) {
   iNuhLId = layer_id_in_nuh[i]
   NumDirectRefLayers[ iNuhLId ] = 0
   NumIndirectRefLayers[iNuhLId] = 0
   iRefLayerMarkedFlag[iNuhLId] = 0;
   for( j = 0; j < i; j++ ) {
      if( direct_dependency_flag[ i ][ j ] ) {
         RefLayerId[ iNuhLId ][ NumDirectRefLayers[ iNuhLId ]++ ] = layer_id_in_nuh[ j ]
         SamplePredEnabledFlag[ iNuhId ][ j ] = ( ( direct_dependency_type[ i ][ j ] + 1 )
& 1 )
         MotionPredEnabledFlag [ iNuhId ][ j ] = ( ( ( direct_dependency_type[ i ][ j ] + 1 )
& 2 ) >> 1 )
         DirectRefLayerIdx[ iNuhLId ][ layer_id_in_nuh[ j ] ] =
NumDirectRefLayers[ iNuhLid ] – 1
         iRefLayerMarkedFlag[iNuhLid] = iRefLayerMarkedFlag[iNuhLid] | (1 << j)
         getIndirectDependentLayers(j, iRefLayerMarkedFlag[iNuhLid],
NumIndirectRefLayers[iNuhLid])
      }
   }
}
``` where the function getIndirectDependentLayers( ) may be:

```
getIndirectDependentLayers(layer_index, iRefLayerMarkedFlag, NumIndirectRefLayers) {
   for( i = 0; i < layer_index; i++) {
      if (direct_dependency_flag[layer_index][i] && !(iRefLayerMarkedFlag & (1 << i)))
      {
         iRefLayerMarkedFlag = iRefLayerMarkedFlag | (1 << i)
         NumIndirectRefLayers ++
         getIndirectDependentLayers(i, iRefLayerMarkedFlag, NumIndirectRefLayers)
      }
   }
}
```

For example, a video coding device may signal a syntax element, such as max_num_dependent_ref_layers_minus1, in VPS extension or SPS to constrain the maximum value of total number of direct and indirect dependent reference layers available for one or more or each enhancement layer in a SHVC main profile. A video coding device may set the variable NumRefLayers[i], where i may be in the range from 1 to the maximum number of layers (e.g., 63), to be less than or equal to the value of max_num_dependent_ref_layers_minus1 plus 1.

A video coding device may utilize a constraint on the number of dependent layers that may include both direct and indirect dependent layers in order to reduce or limit the complexity of an SHVC codec. For example, a multi-loop SHVC encoder may include a processor with executable instructions for limiting the number of reference layers for a profile. The multi-loop SHVC encoder may set a reference layer limit. For example, the reference layer limit may be used as a constraint to limit the maximum number of direct and indirect dependent layers. The multi-loop SHVC encoder may encode a video signal into layers for the profile such that the total number of direct and indirect reference layers for a given layer in the encoded video signal is less than the reference layer limit.

For example, for each layer, the multi-loop SHVC encoder may determine the total number of direct and indirect reference layers. The multi-loop SHVC encoder may determine whether the total number of direct and indirect reference layers for the layer is less than the reference layer limit. The encoded video signal may be sent to a decoder, for example, if the total number of direct and indirect reference layers for each layer is less than the reference layer limit.

For example, a video coding device may utilize a constraint for scalable main profile. The total number of direct and indirect dependent layers of a particular enhancement layer, NumRefLayers[iNuhLId], may not exceed N where N may be the maximum number of dependent layers that may be used and/or allowed by a scalable main profile, a tier, and/or a level.

For example, the SHVC main profile may specify the maximum number of CTBs (Coding Tree Blocks) that may be allowed or used for a certain or particular tier and/or level. In an example, a video coding device may derive N from the maximum number of CTBs based on one or more or each dependent layer's video resolutions.

A video coding device may signal in one or more ways to provide the constraints. For example, a video coding device may signal two ways to provide one or more constraints described herein in SHVC.

For example, a video coding device may not signal an extra syntax element and the constraint may be provided on the derived variables such as NumDirectRefLayers[iNuhLId] and NumRefLayers[iNuhLId]. A video coding device may set the values of the syntax elements, such as direct_dependency_flag, to fulfill the constraints with the maximum number of direct and/or indirect dependent layers. A video coding device may use the syntax elements, such as direct_dependency_flag, to derive the variables NumDirectRefLayers[iNuhLId] and NumRefLayers[iNuhLId].

A video coding device may signal a syntax element, such as max_num_direct_dependent_layer_minus1 and/or max_num_dependent_layers_minus1, in a parameter set to indicate the total number of dependent layers. A parameter set may be an SPS or VPS. A video coding device may set the value of the syntax element, for example, based on the profile, tier, and/or level the codec may support. A video coding device may use the syntax element max_num_dependent_layer_minus1.

A video coding device may use a syntax element to indicate the maximum number of dependent layers among layers (e.g., as shown in Table 166) and/or the maximum number of dependent layers of each individual enhancement layer (e.g., as shown in Table 17) since each layer may support a different profile and/or level, for example, when a syntax element may be signaled in the VPS extension.

TABLE 16

Example syntax element in VPS

| vps_extensiont( ) { | Descriptor |
|---|---|
| .... | |
| max_num_dependent_layers_minus1 | u(6) |
| .... | |
| } | |

A video coding device may use the max_num_dependent_layers_minus to specify the maximum number of the direct and indirect dependent layers for each layer. The value of max_num_dependent_layers_minus1 may be in the range of 0 o 62. When it may not be present, the value of max_num_dependent_layers_minus1 may be equal to 0.

TABLE 17

Example syntax element in VPS

| vps_extension( ) { | Descriptor |
|---|---|
| .... | |
| for (i=1; i<=vps_max_layers_minus1; i++) | |
|    max_num_dependent_layers_minus1[i] | u(6) |
| .... | |
| } | |

A video coding device may use the max_num_dependent_layers_minus1[i] to specify the maximum number of the direct and indirect dependent layers for the $i^{th}$ layer. The value of max_num_dependent_layers_minus1 may be in the range of 0 o 62. When it may not be present, the value of max_num_dependent_layers_minus1 may be equal to 0.

A video coding device may use the max_num_dependent_layers_minus1 to condition some of the syntax elements signaled in VPS. For example, when there may be a dependent layer available for each layer (max_num_dependent_layers_minus1=0), the syntax elements such as "all_ref_layers_active_flag" and "max_one_active_ref_layer_flag" may not be present, as shown in Table 18.

TABLE 18

Example conditioning of syntax element in VPS

| vps_extension( ) { | Descriptor |
|---|---|
| .... | |
| max_num_dependent_layers_minus1 | u(6) |
| .... | |
| If (max_num_dependent_layers_minus1) | |
|    all_ref_layers_active_flag | u(1) |
| .... | |
| If (max_num_dependent_layers_minus1) | |
|    max_one_active_ref_layer_flag | u(1) |
| .... | |
| } | |

A video coding device may use the syntax element signaled in SPS (e.g., as shown in Table 19) to indicate the maximum number of dependent layers of the active layer that may be associated with the SPS. A video coding device may use the syntax element to condition the scaled offset syntax elements signaled in the SPS extension. Table 20 illustrates example SPS extension syntax changes that may be provided and/or utilized.

TABLE 19

Example syntax element in SPS

| seq_parameter_set_rbsp( ) { | Descriptor |
|---|---|
| .... | |
| If (nuh_layer_id > 0) | |
| max_num_dependent_layers | u(6) |
| .... | |
| } | |

TABLE 20

Example SPS extension syntax changes

| sps_extension( ) { | Descriptor |
|---|---|
| inter_view_mv_vert_constraint_flag | u(1) |
| ~~num_scaled_ref_layer_offsets~~ | ~~ue(v)~~ |
| for( i = 0; i < ~~num_scaled_ref_layer_offsets~~max_num_dependent_layers; i++) { | |
| scaled_ref_layer_left_offset[ i ] | se(v) |
| scaled_ref_layer_top_offset[ i ] | se(v) |
| scaled_ref_layer_right_offset[ i ] | se(v) |
| scaled_ref_layer_bottom_offset[ i ] | se(v) |
| } | |
| } | |

A video coding device may use a main profile constraint on a base layer. For example, a video coding device may use a sub-bitstream extraction. A video coding device may use inputs into the sub-bitstream extraction. Inputs into the sub bit-stream extraction may be a bitstream, a target highest TemporalId value tIdTarget, and/or a target layer identifier list layerIdListTarget. Output of the sub-bitstream extraction may be a sub-bitstream. Bitstream conformance for the input bitstream may provide that an output sub-bitstream of the process with tIdTarget be equal to a value in the range of 0 to 6, inclusive. The layerIdListTarget equal to the layer identifier list associated with a layer set specified in the active video parameter set may be a conforming bitstream. A conforming bitstream may include one or more coded slice segment NAL units with nuh_layer_id equal to 0 and TemporalId equal to 0.

A video coding device may derive the output sub-bit-stream as follows. When one or more of the following conditions may be true, a video coding device may remove SEI NAL units that may have nuh_layer_id equal to 0 and that may include a non-nested buffering period SEI message, a non-nested picture timing SEI message, or a non-nested decoding unit information SEI message. The video coding device may remove SEI NAL units when the layerIdList-Target may not include the values of nuh_layer_id in the NAL units in the bitstream (e.g., in a condition). The video coding device may remove SEI NAL units when a tIdTarget may be less than the greatest TemporalId in the NAL units in the bitstream (e.g., in a condition). The video coding device may remove SEI NAL units when a "smart" bit-stream extractor may include appropriate non-nested buff-ering picture SEI messages, non-nested picture timing SEI messages, and non-nested decoding unit information SEI messages in the extracted sub-bitstream, provided that the SEI messages applicable to the sub-bitstream may have been present as nested SEI messages in the original bitstream. The video coding device may remove NAL units with Tempo-ralId greater than tIdTarget or nuh_layer_id that may not be among the values included in layerIdListTarget.

Figure 8:
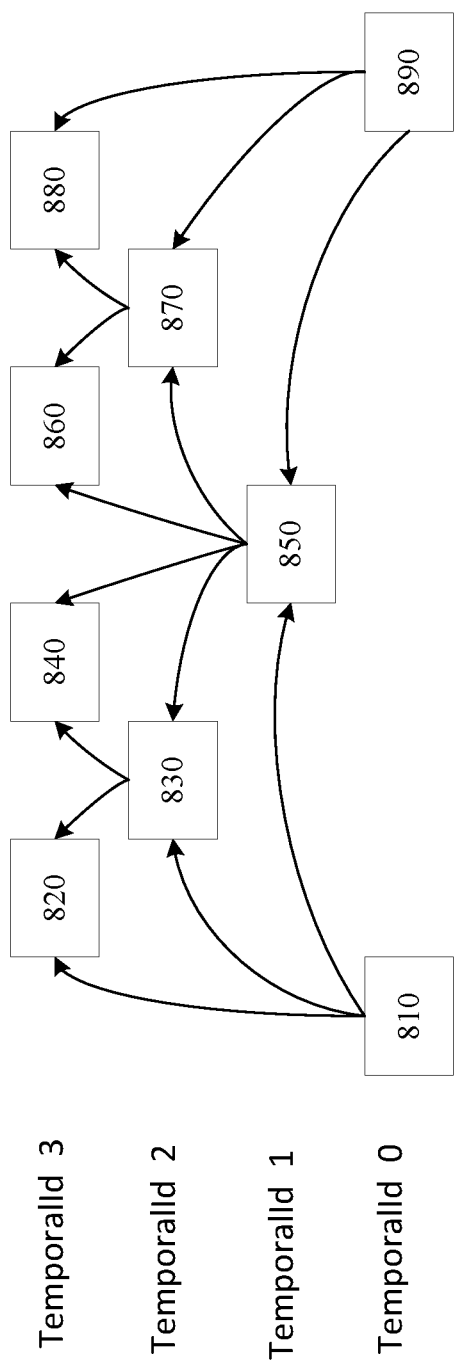
FIG. 8 illustrates an example temporal layer of a hierarchical video coding structure.

FIG. 8 illustrates a temporal layer example of a single layer hierarchical video coding structure. The first temporal layer with TemporalId equal to 0 may include pictures POC810 and POC890; the second temporal layer with TemporalId equal to 1 may include picture POC850; the third temporal layer with TemporalId equal to 2 may include pictures POC830 and POC 870; and the last temporal layer with TemporalId equal to 3 may include pictures POC820, POC840, POC860 and POC880. In an example of tIdTarget being set equal to 2 for the sub-bitstream extraction, the output bitstream from sub-bitstream extraction process may include pictures of POC810, POC830, POC850, POC870 and POC890.

A conforming bitstream may include one or more coded slice segment NAL units with nuh_layer_id equal to 0 and TemporalId equal to 0. An output sub-bitstream of the extraction process may be a conforming bitstream. A video coding device may use the constraint for a SHVC main profile to help guarantee the base layer NAL unit whose nuh_layer_id equal to 0 and TemporalId equal to 0 be included in an extracted sub-bitstream, for example, if the same conformance requirement may apply to the Multiview and Scalable extensions of HEVC.

An example constraint may be as follows. A video coding device may include one or more access units including a picture with its nuh_layer_id equal to 0 and TemporalId equal to 0 in a conforming SHVC bitstream. For example, a layer comprising a picture with nuh_layer_id equal to 0 and TemporalId equal to 0 may be the direct or indirect depen-dent layer of the layer for each nuh_layer_id value in the layer identifier list, TargetDecLayerIdList. A video coding device may utilize the constraint specify that a simulcast layer may be available in a SHVC bitstream.

Figure 9A:
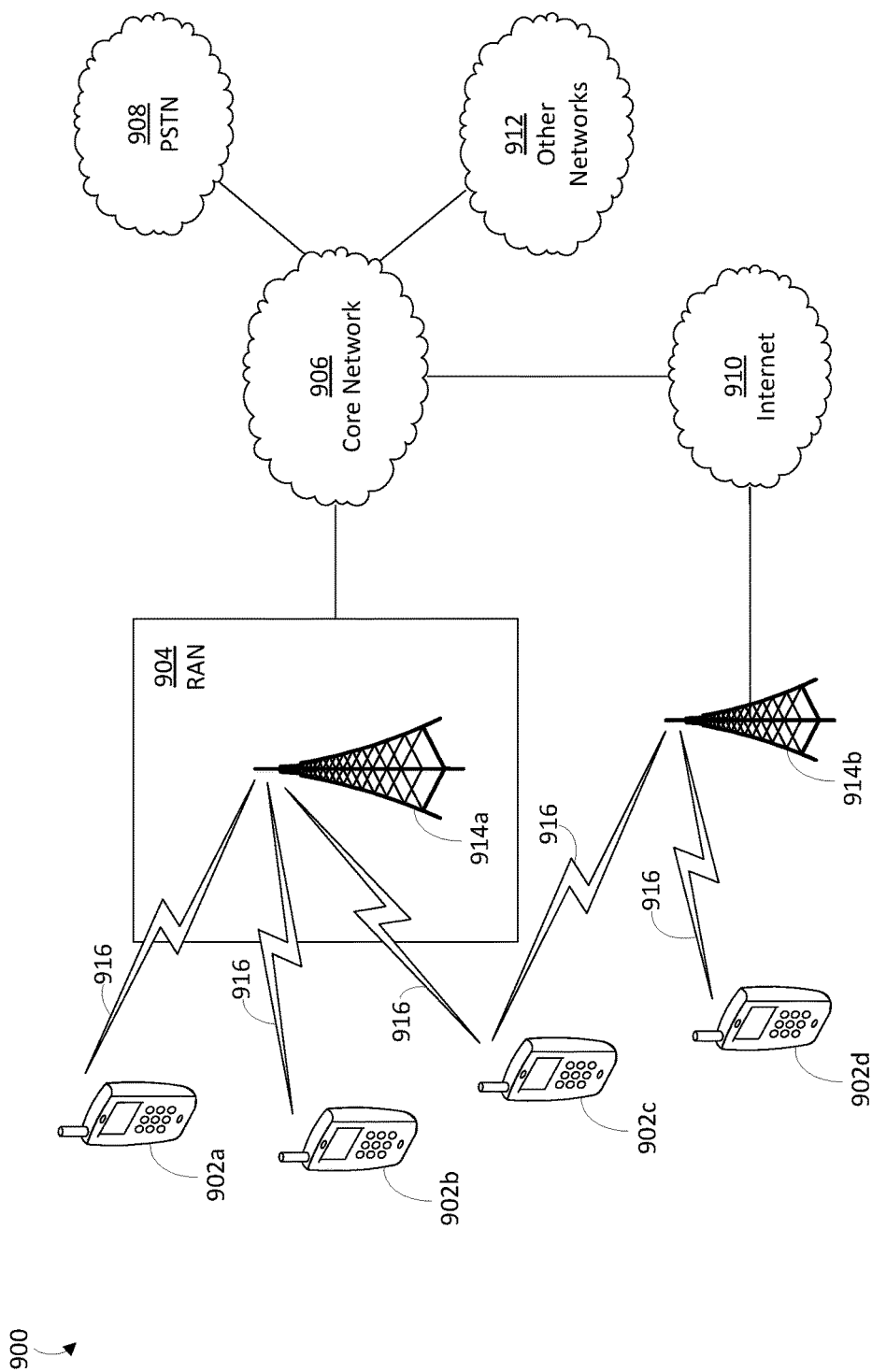
FIG. 9A is a system diagram of an example communications system in which one or more disclosed embodiments may be implemented.

FIG. 9A is a diagram of an example communications system 900 in which one or more disclosed embodiments may be implemented. The communications system 900 may be a multiple access system that provides content, such as voice, data, video, messaging, broadcast, etc., to multiple wireless users. The communications system 900 may enable multiple wireless users to access such content through the sharing of system resources, including wireless bandwidth.

For example, the communications system 900 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 9A, the communications system 900 may include wireless transmit/receive units (WTRUs) 902a, 902b. 902c, and/or 902d (which generally or collectively may be referred to as WTRU 902), a radio access network (RAN) 903/904/905, a core network 906/907/909, a public switched telephone network (PSTN) 908, the Internet 910, and other networks 912, though it will be appreciated that the disclosed embodiments contemplate any number of WTRUs, base stations, networks, and/or network elements. Each of the WTRUs 902a, 902b, 902c, 902d may be any type of device configured to operate and/or communicate in a wireless environment. By way of example, the WTRUs 902a, 902b, 902c, 902d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 900 may also include a base station 914a and a base station 914b. Each of the base stations 914a, 914b may be any type of device configured to wirelessly interface with at least one of the WTRUs 902a, 902b, 902c, 902d to facilitate access to one or more communication networks, such as the core network 906/907/909, the Internet 910, and/or the networks 912. By way of example, the base stations 914a. 914b may be a base transceiver station (BTS), a Node-B, an eNode B, a Home Node B, a Home eNode B, a site controller, an access point (AP), a wireless router, and the like. While the base stations 914a. 914b are each depicted as a single element, it will be appreciated that the base stations 914a, 914b may include any number of interconnected base stations and/or network elements.

The base station 914a may be part of the RAN 903/904/905, which may also include other base stations and/or network elements (not shown), such as a base station controller (BSC), a radio network controller (RNC), relay nodes, etc. The base station 914a and/or the base station 914b may be configured to transmit and/or receive wireless signals within a particular geographic region, which may be referred to as a cell (not shown). The cell may further be divided into cell sectors. For example, the cell associated with the base station 914a may be divided into three sectors. Thus, in one embodiment, the base station 914a may include three transceivers, e.g., one for each sector of the cell. In another embodiment, the base station 914a may employ multiple-input multiple output (MIMO) technology and, therefore, may utilize multiple transceivers for each sector of the cell.

The base stations 914a. 914b may communicate with one or more of the WTRUs 902a, 902b, 902c, 902d over an air interface 915/916/917, which may be any suitable wireless communication link (e.g., radio frequency (RF), microwave, infrared (IR), ultraviolet (UV), visible light, etc.). The air interface 915/916/917 may be established using any suitable radio access technology (RAT).

More specifically, as noted above, the communications system 900 may be a multiple access system and may employ one or more channel access schemes, such as CDMA, TDMA, FDMA, OFDMA, SC-FDMA, and the like.

For example, the base station 914a in the RAN 903/904/905 and the WTRUs 902a, 902b, 902c may implement a radio technology such as Universal Mobile Telecommunications System (UMTS) Terrestrial Radio Access (UTRA), which may establish the air interface 915/916/917 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 914a and the WTRUs 902a, 902b, 902c may implement a radio technology such as Evolved UMTS Terrestrial Radio Access (E-UTRA), which may establish the air interface 915/916/917 using Long Term Evolution (LTE) and/or LTE-Advanced (LTE-A).

In other embodiments, the base station 914a and the WTRUs 902a. 902b, 902c may implement radio technologies such as IEEE 802.16 (e.g., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856). Global System for Mobile communications (GSM), Enhanced Data rates for GSM Evolution (EDGE), GSM EDGE (GERAN), and the like.

The base station 914b in FIG. 9A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 914b and the WTRUs 902c. 902d may implement a radio technology such as IEEE 802.11 to establish a wireless local area network (WLAN). In another embodiment, the base station 914b and the WTRUs 902c, 902d may implement a radio technology such as IEEE 802.15 to establish a wireless personal area network (WPAN). In yet another embodiment, the base station 914b and the WTRUs 902c, 902d may utilize a cellular-based RAT (e.g., WCDMA, CDMA2000, GSM, LTE, LTE-A, etc.) to establish a picocell or femtocell. As shown in FIG. 9A, the base station 914b may have a direct connection to the Internet 910. Thus, the base station 914b may not be required to access the Internet 910 via the core network 906/907/909.

The RAN 903/904/905 may be in communication with the core network 906/907/909, which may be any type of network configured to provide voice, data, applications, and/or voice over internet protocol (VoIP) services to one or more of the WTRUs 902a, 902b, 902c, 902d. For example, the core network 906/907/909 may provide call control, billing services, mobile location-based services, pre-paid calling, Internet connectivity, video distribution, etc., and/or perform high-level security functions, such as user authentication. Although not shown in FIG. 9A, it will be appreciated that the RAN 903/904/905 and/or the core network 906/907/909 may be in direct or indirect communication with other RANs that employ the same RAT as the RAN 903/904/905 or a different RAT. For example, in addition to being connected to the RAN 903/904/905, which may be utilizing an E-UTRA radio technology, the core network 906/907/909 may also be in communication with another RAN (not shown) employing a GSM radio technology.

The core network 906/907/909 may also serve as a gateway for the WTRUs 902a, 902b, 902c. 902d to access the PSTN 908, the Internet 910, and/or other networks 912. The PSTN 908 may include circuit-switched telephone networks that provide plain old telephone service (POTS).

The Internet 910 may include a global system of interconnected computer networks and devices that use common communication protocols, such as the transmission control protocol (TCP), user datagram protocol (UDP) and the internet protocol (IP) in the TCP/IP internet protocol suite. The networks 912 may include wired or wireless communications networks owned and/or operated by other service providers. For example, the networks 912 may include another core network connected to one or more RANs, which may employ the same RAT as the RAN 903/904/905 or a different RAT.

Some or all of the WTRUs 902a, 902b, 902c, 902d in the communications system 100 may include multi-mode capabilities, e.g., the WTRUs 902a, 902b, 902c. 902d may include multiple transceivers for communicating with different wireless networks over different wireless links. For example, the WTRU 902c shown in FIG. 9A may be configured to communicate with the base station 914a, which may employ a cellular-based radio technology, and with the base station 914b, which may employ an IEEE 802 radio technology.

Figure 9B:
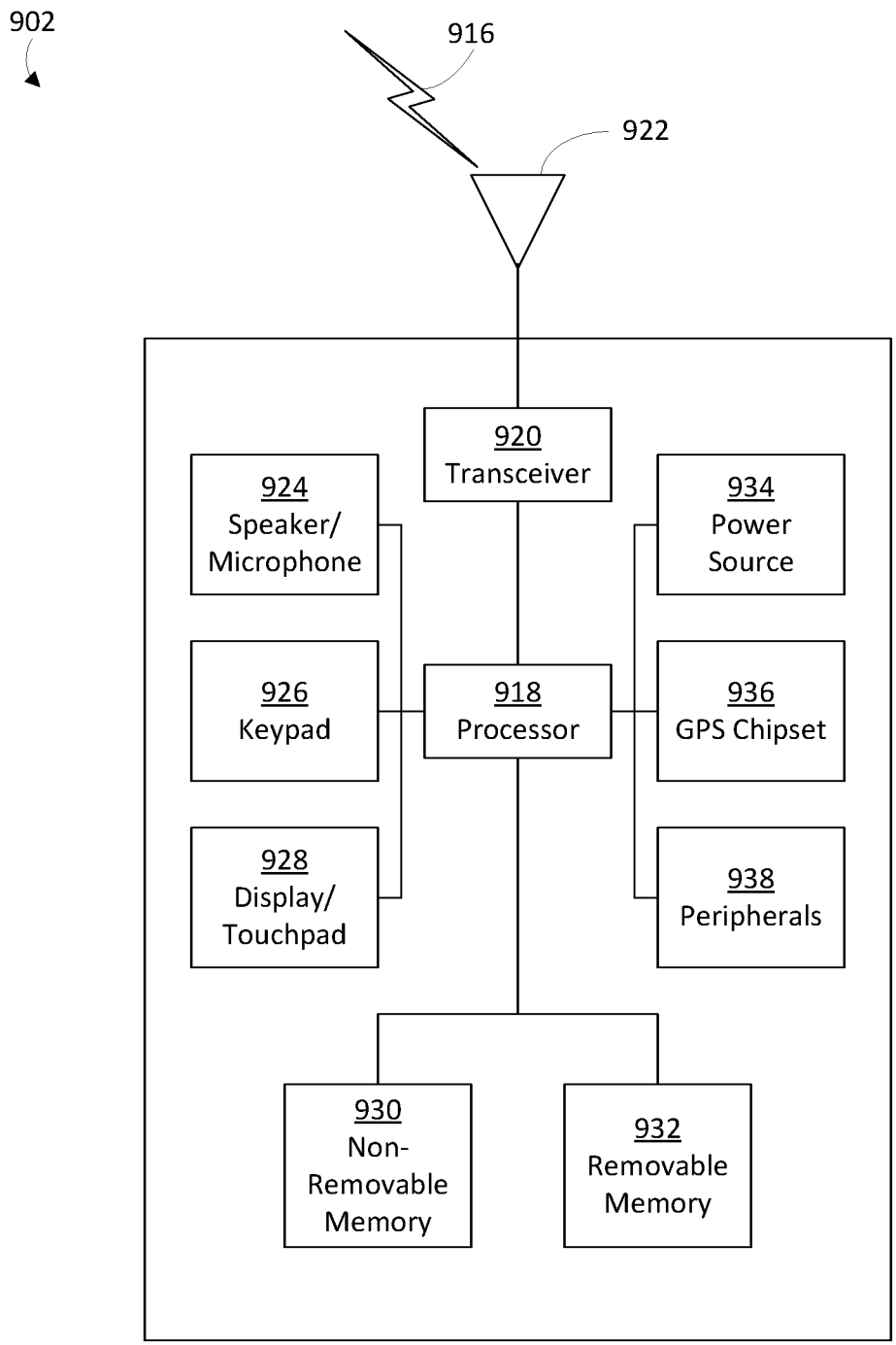
FIG. 9B is a system diagram of an example wireless transmit/receive unit (WTRU) that may be used within the communications system illustrated in FIG. 9A.

FIG. 9B is a system diagram of an example WTRU 902. As shown in FIG. 9B, the WTRU 902 may include a processor 918, a transceiver 920, a transmit/receive element 922, a speaker/microphone 924, a keypad 926, a display/touchpad 928, non-removable memory 930, removable memory 932, a power source 934, a global positioning system (GPS) chipset 936, and other peripherals 938. It will be appreciated that the WTRU 902 may include any subcombination of the foregoing elements while remaining consistent with an embodiment. Also, embodiments contemplate that the base stations 914a and 914b, and/or the nodes that base stations 914a and 914b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 9B and described herein.

The processor 918 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 918 may perform signal coding, data processing, power control, input/output processing, and/or any other functionality that enables the WTRU 902 to operate in a wireless environment. The processor 918 may be coupled to the transceiver 920, which may be coupled to the transmit/receive element 922. While FIG. 9B depicts the processor 918 and the transceiver 920 as separate components, it will be appreciated that the processor 918 and the transceiver 920 may be integrated together in an electronic package or chip.

The transmit/receive element 922 may be configured to transmit signals to, or receive signals from, a base station (e.g., the base station 914a) over the air interface 915/916/917. For example, in one embodiment, the transmit/receive element 922 may be an antenna configured to transmit and/or receive RF signals. In another embodiment, the transmit/receive element 922 may be an emitter/detector configured to transmit and/or receive IR, UV, or visible light signals, for example. In yet another embodiment, the transmit/receive element 922 may be configured to transmit and receive both RF and light signals. It will be appreciated that the transmit/receive element 922 may be configured to transmit and/or receive any combination of wireless signals.

In addition, although the transmit/receive element 922 is depicted in FIG. 9B as a single element, the WTRU 902 may include any number of transmit/receive elements 922. More specifically, the WTRU 902 may employ MIMO technology. Thus, in one embodiment, the WTRU 902 may include two or more transmit/receive elements 922 (e.g., multiple antennas) for transmitting and receiving wireless signals over the air interface 915/916/917.

The transceiver 920 may be configured to modulate the signals that are to be transmitted by the transmit/receive element 922 and to demodulate the signals that are received by the transmit/receive element 922. As noted above, the WTRU 902 may have multi-mode capabilities. Thus, the transceiver 920 may include multiple transceivers for enabling the WTRU 902 to communicate via multiple RATs, such as UTRA and IEEE 802.11, for example.

The processor 918 of the WTRU 902 may be coupled to, and may receive user input data from, the speaker/microphone 924, the keypad 926, and/or the display/touchpad 928 (e.g., a liquid crystal display (LCD) display unit or organic light-emitting diode (OLED) display unit). The processor 918 may also output user data to the speaker/microphone 924, the keypad 926, and/or the display/touchpad 928. In addition, the processor 918 may access information from, and store data in, any type of suitable memory, such as the non-removable memory 930 and/or the removable memory 932. The non-removable memory 930 may include random-access memory (RAM), read-only memory (ROM), a hard disk, or any other type of memory storage device. The removable memory 932 may include a subscriber identity module (SIM) card, a memory stick, a secure digital (SD) memory card, and the like. In other embodiments, the processor 918 may access information from, and store data in, memory that is not physically located on the WTRU 902, such as on a server or a home computer (not shown).

The processor 918 may receive power from the power source 934, and may be configured to distribute and/or control the power to the other components in the WTRU 902. The power source 934 may be any suitable device for powering the WTRU 902. For example, the power source 934 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 918 may also be coupled to the GPS chipset 936, which may be configured to provide location information (e.g., longitude and latitude) regarding the current location of the WTRU 902. In addition to, or in lieu of, the information from the GPS chipset 936, the WTRU 902 may receive location information over the air interface 915/916/917 from a base station (e.g., base stations 914a. 914b) and/or determine its location based on the timing of the signals being received from two or more nearby base stations. It will be appreciated that the WTRU 902 may acquire location information by way of any suitable location-determination implementation while remaining consistent with an embodiment.

The processor 918 may further be coupled to other peripherals 938, which may include one or more software and/or hardware modules that provide additional features, functionality and/or wired or wireless connectivity. For example, the peripherals 938 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 9C:
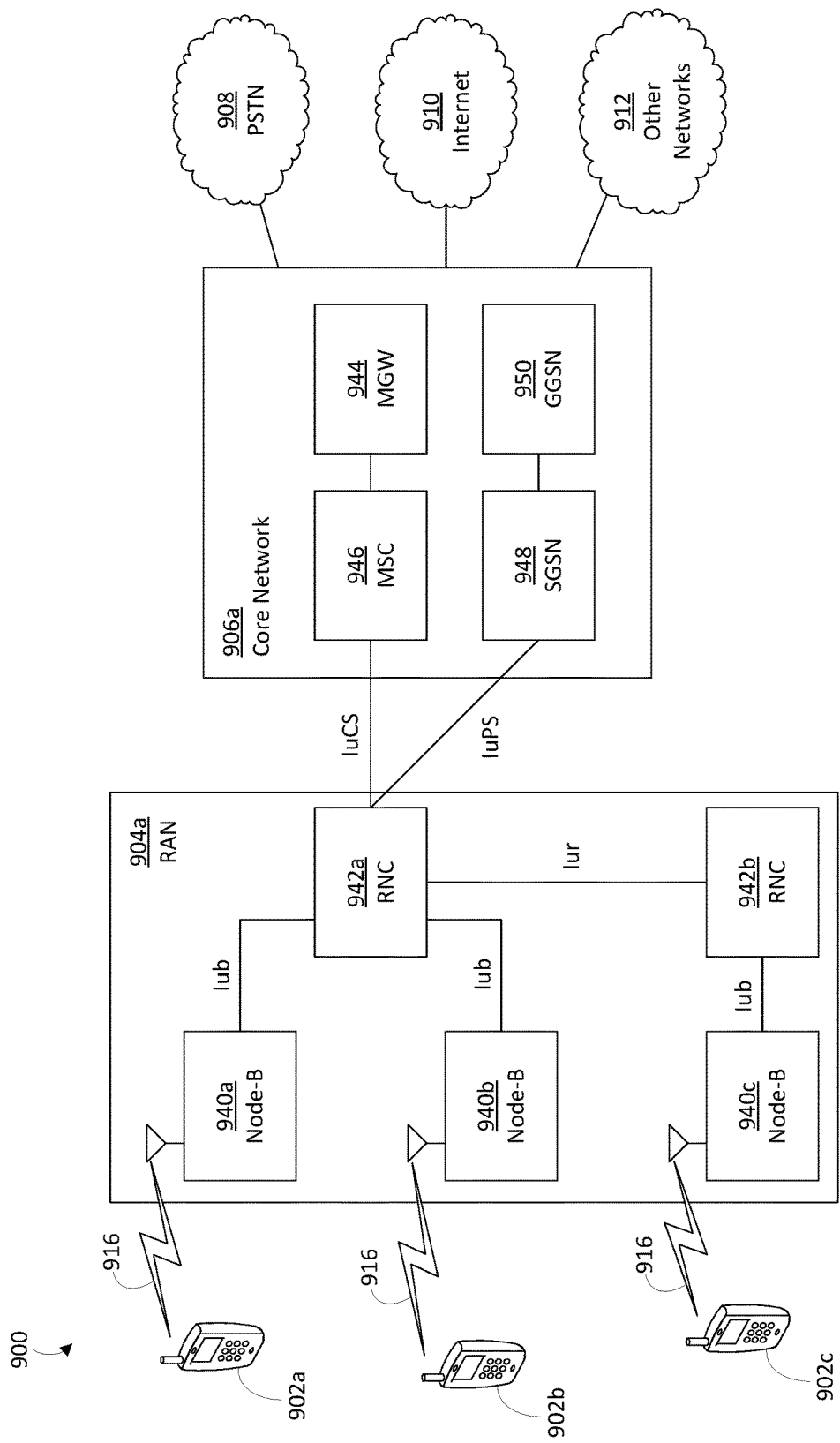
FIG. 9C is a system diagram of an example radio access network and an example core network that may be used within the communications system illustrated in FIG. 9A.

FIG. 9C is a system diagram of the RAN 903 and the core network 906 according to an embodiment. As noted above, the RAN 903 may employ a UTRA radio technology to communicate with the WTRUs 902a, 902b, 902c over the air interface 915. The RAN 903 may also be in communication with the core network 906. As shown in FIG. 9C, the RAN 903 may include Node-Bs 940a, 940b, 940c, which may each include one or more transceivers for communicating with the WTRUs 902a, 902b, 902c over the air interface 915. The Node-Bs 940a, 940b, 940c may each be associated with a particular cell (not shown) within the RAN 903. The RAN 903 may also include RNCs 942a. 942b. It will be appreciated that the RAN 903 may include any number of Node-Bs and RNCs while remaining consistent with an embodiment.

As shown in FIG. 9C, the Node-Bs 940a. 940b may be in communication with the RNC 942a. Additionally, the Node-B 940c may be in communication with the RNC 942b. The Node-Bs 940a, 940b, 940c may communicate with the respective RNCs 942a. 942b via an Iub interface. The RNCs 942a, 942b may be in communication with one another via an Iur interface. Each of the RNCs 942a, 942b may be configured to control the respective Node-Bs 940a, 940b, 940c to which it is connected. In addition, each of the RNCs 942a, 942b may be configured to carry out or support other functionality, such as outer loop power control, load control, admission control, packet scheduling, handover control, macrodiversity, security functions, data encryption, and the like.

The core network 906 shown in FIG. 9C may include a media gateway (MGW) 944, a mobile switching center (MSC) 946, a serving GPRS support node (SGSN) 948, and/or a gateway GPRS support node (GGSN) 950. While each of the foregoing elements are depicted as part of the core network 906, it will be appreciated that any one of these elements may be owned and/or operated by an entity other than the core network operator.

The RNC 942a in the RAN 903 may be connected to the MSC 946 in the core network 906 via an IuCS interface. The MSC 946 may be connected to the MGW 944. The MSC 946 and the MGW 944 may provide the WTRUs 902a, 902b. 902c with access to circuit-switched networks, such as the PTSN 908, to facilitate communications between the WTRUs 902a, 902b. 902c and traditional land-line communications devices.

The RNC 942a in the RAN 903 may also be connected to the SGSN 948 in the core network 906 via an IuPS interface. The SGSN 948 may be connected to the GGSN 950. The SGSN 948 and the GGSN 950 may provide the WTRUs 902a, 902b, 902c with access to packet-switched networks, such as the Internet 910, to facilitate communications between and the WTRUs 902a, 902b, 902c and IP-enabled devices.

As noted above, the core network 906 may also be connected to the networks 912, which may include other wired or wireless networks that are owned and/or operated by other service providers.

Figure 9D:
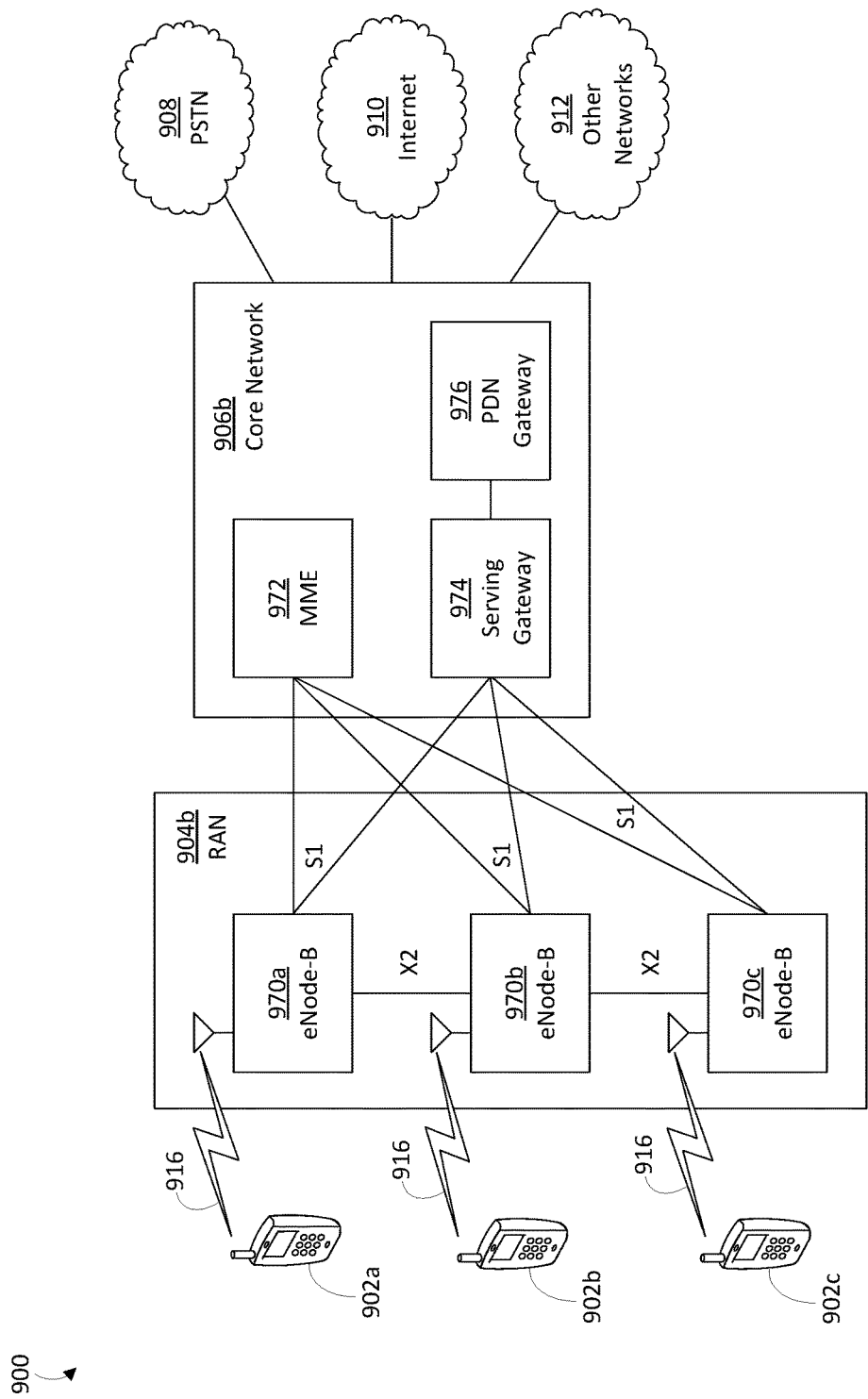
FIG. 9D is a system diagram of another example radio access network and another example core network that may be used within the communications system illustrated in FIG. 9A.

FIG. 9D is a system diagram of the RAN 904 and the core network 907 according to an embodiment. As noted above, the RAN 904 may employ an E-UTRA radio technology to communicate with the WTRUs 902a, 902b, 902c over the air interface 916. The RAN 904 may also be in communication with the core network 907.

The RAN 904 may include eNode-Bs 960a, 960b, 960c, though it will be appreciated that the RAN 904 may include any number of eNode-Bs while remaining consistent with an embodiment. The eNode-Bs 960a, 960b, 960c may each include one or more transceivers for communicating with the WTRUs 902a. 902b, 902c over the air interface 916. In one embodiment, the eNode-Bs 960a, 960b, 960c may implement MIMO technology. Thus, the eNode-B 960a, for example, may use multiple antennas to transmit wireless signals to, and receive wireless signals from, the WTRU 902a.

Each of the eNode-Bs 960a, 960b, 960c may be associated with a particular cell (not shown) and may be configured to handle radio resource management decisions, handover decisions, scheduling of users in the uplink and/or downlink, and the like. As shown in FIG. 9D, the eNode-Bs 960a, 960b. 960c may communicate with one another over an X2 interface.

The core network 907 shown in FIG. 9D may include a mobility management gateway (MME) 962, a serving gateway 964, and a packet data network (PDN) gateway 966. While each of the foregoing elements are depicted as part of the core network 907, it will be appreciated that any one of these elements may be owned and/or operated by an entity other than the core network operator.

The MME 962 may be connected to each of the eNode-Bs 960a, 960b, 960c in the RAN 904 via an S1 interface and may serve as a control node. For example, the MME 962 may be responsible for authenticating users of the WTRUs 902a, 902b, 902c, bearer activation/deactivation, selecting a particular serving gateway during an initial attach of the WTRUs 902a, 902b, 902c, and the like. The MME 962 may also provide a control plane function for switching between the RAN 904 and other RANs (not shown) that employ other radio technologies, such as GSM or WCDMA.

The serving gateway 964 may be connected to each of the eNode-Bs 960a, 960b, 960c in the RAN 904 via the S1 interface. The serving gateway 964 may generally route and forward user data packets to/from the WTRUs 902a, 902b, 902c. The serving gateway 964 may also perform other functions, such as anchoring user planes during inter-eNode B handovers, triggering paging when downlink data is available for the WTRUs 902a, 902b, 902c, managing and storing contexts of the WTRUs 902a, 902b, 902c, and the like.

The serving gateway 964 may also be connected to the PDN gateway 966, which may provide the WTRUs 902a, 902b, 902c with access to packet-switched networks, such as the Internet 910, to facilitate communications between the WTRUs 902a, 902b. 902c and IP-enabled devices.

The core network 907 may facilitate communications with other networks. For example, the core network 907 may provide the WTRUs 902a, 902b. 902c with access to circuit-switched networks, such as the PTSN 908, to facilitate communications between the WTRUs 902a, 902b, 902c and traditional land-line communications devices. For example, the core network 907 may include, or may communicate with, an IP gateway (e.g., an IP multimedia subsystem (IMS) server) that serves as an interface between the core network 907 and the PTSN 908. In addition, the core network 907 may provide the WTRUs 902a, 902b, 902c with access to the networks 912, which may include other wired or wireless networks that are owned and/or operated by other service providers.

Figure 9E:
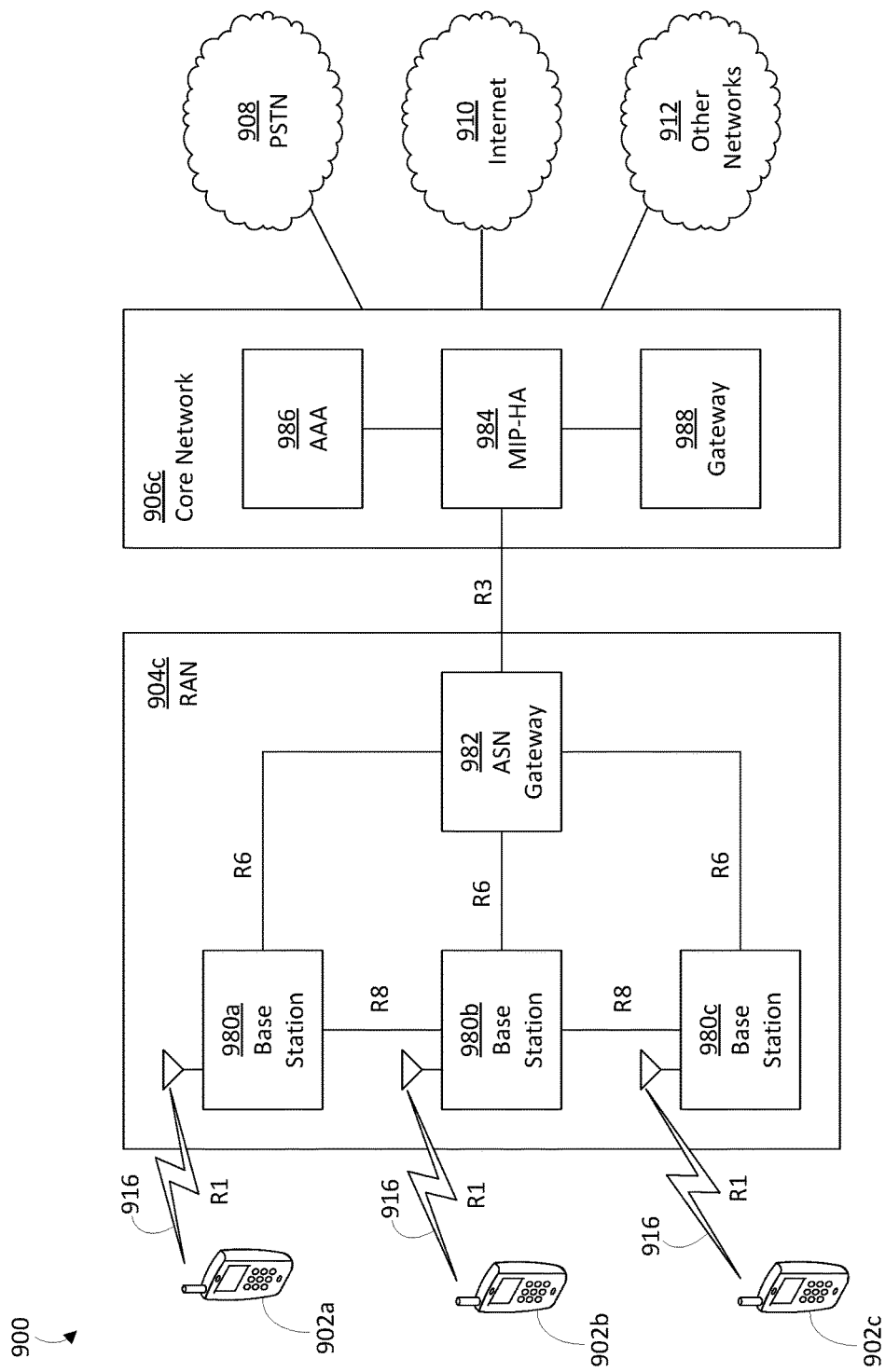
FIG. 9E is a system diagram of another example radio access network and another example core network that may be used within the communications system illustrated in FIG. 9A.

FIG. 9E is a system diagram of the RAN 905 and the core network 909 according to an embodiment. The RAN 905 may be an access service network (ASN) that employs IEEE 802.16 radio technology to communicate with the WTRUs 902a, 902b, 902c over the air interface 917. As will be further discussed below, the communication links between the different functional entities of the WTRUs 902a, 902b, 902c, the RAN 905, and the core network 909 may be defined as reference points.

As shown in FIG. 9E, the RAN 905 may include base stations 980a, 980b, 980c, and an ASN gateway 982, though it will be appreciated that the RAN 905 may include any number of base stations and ASN gateways while remaining consistent with an embodiment. The base stations 980a. 980b, 980c may each be associated with a particular cell (not shown) in the RAN 905 and may each include one or more transceivers for communicating with the WTRUs 902a, 902b, 902c over the air interface 917. In one embodiment, the base stations 980a, 980b, 980c may implement MIMO technology. Thus, the base station 980a, for example, may use multiple antennas to transmit wireless signals to, and receive wireless signals from, the WTRU 902a. The base stations 980a, 980b. 980c may also provide mobility management functions, such as handoff triggering, tunnel establishment, radio resource management, traffic classification, quality of service (QoS) policy enforcement, and the like. The ASN gateway 982 may serve as a traffic aggregation point and may be responsible for paging, caching of subscriber profiles, routing to the core network 909, and the like.

The air interface 917 between the WTRUs 902a, 902b, 9602c and the RAN 905 may be defined as an R1 reference point that implements the IEEE 802.16 specification. In addition, each of the WTRUs 902a, 902b, 902c may establish a logical interface (not shown) with the core network 909. The logical interface between the WTRUs 902a, 902b, 902c and the core network 909 may be defined as an R2 reference point, which may be used for authentication, authorization. IP host configuration management, and/or mobility management.

The communication link between each of the base stations 980a, 980b. 980c may be defined as an R8 reference point that includes protocols for facilitating WTRU handovers and the transfer of data between base stations. The communication link between the base stations 980a. 980b, 980c and the ASN gateway 982 may be defined as an R6 reference point. The R6 reference point may include protocols for facilitating mobility management based on mobility events associated with each of the WTRUs 902a. 902b, 902c.

As shown in FIG. 9E, the RAN 905 may be connected to the core network 909. The communication link between the RAN 905 and the core network 909 may defined as an R3 reference point that includes protocols for facilitating data transfer and mobility management capabilities, for example. The core network 909 may include a mobile IP home agent (MIP-HA) 984, an authentication, authorization, accounting (AAA) server 986, and a gateway 988. While each of the foregoing elements are depicted as part of the core network 909, it will be appreciated that any one of these elements may be owned and/or operated by an entity other than the core network operator.

The MIP-HA may be responsible for IP address management, and may enable the WTRUs 902a. 902b, 902c to roam between different ASNs and/or different core networks. The MIP-HA 984 may provide the WTRUs 902a, 902b, 902c with access to packet-switched networks, such as the Internet 910, to facilitate communications between the WTRUs 902a. 902b, 902c and IP-enabled devices. The AAA server 986 may be responsible for user authentication and for supporting user services. The gateway 988 may facilitate interworking with other networks. For example, the gateway 988 may provide the WTRUs 902a, 902b. 902c with access to circuit-switched networks, such as the PTSN 908, to facilitate communications between the WTRUs 902a, 902b, 902c and traditional land-line communications devices. In addition, the gateway 988 may provide the WTRUs 902a. 902b. 902c with access to the networks 912, which may include other wired or wireless networks that are owned and/or operated by other service providers.

Although not shown in FIG. 9E, it will be appreciated that the RAN 905 may be connected to other ASNs and the core network 909 may be connected to other core networks. The communication link between the RAN 905 the other ASNs may be defined as an R4 reference point, which may include protocols for coordinating the mobility of the WTRUs 902a, 902b. 902c between the RAN 905 and the other ASNs. The communication link between the core network 909 and the other core networks may be defined as an R5 reference, which may include protocols for facilitating interworking between home core networks and visited core networks.

The processes and instrumentalities described herein may apply in any combination, may apply to other wireless technology, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A video decoding method comprising:
receiving a video bitstream comprising a video parameter set (VPS) and a plurality of layers;
determining direct dependency relations associated with the plurality of layers based on a default direct dependency flag in the VPS, wherein:
on a condition that the default direct dependency flag indicates layer-specific direct dependency type information is present in the VPS, the direct dependency relations are determined from the layer-specific direct dependency type information in the VPS, and on a condition that the default direct dependency flag indicates the layer-specific direct dependency type information is absent in the VPS, the direct dependency relations are determined based on a default dependency, wherein the default dependency indicates whether lower layers of a current layer can be used for an inter-layer sample prediction and whether the lower layers of the current layer can be used for an inter-layer motion prediction for the current layer; and decoding the video bitstream based on the determined direct dependency relations.

2. The video decoding method of claim 1, wherein the default dependency indicates that direct dependent layers of the current layer can be used for the inter-layer sample prediction and the inter-layer motion prediction for the current layer.

3. The video decoding method of claim 1, wherein the default direct dependency flag indicates the layer-specific direct dependency type information is absent in the VPS when the default direct dependency flag equals to 1, and the default direct dependency flag indicates the layer-specific direct dependency type information is present in the VPS when the default direct dependency flag equals to 0.

4. The video decoding method of claim 1, wherein on a condition that the default direct dependency flag indicates the layer-specific direct dependency type information is absent in the VPS, the video bitstream is decoded based on the default dependency.

5. The video decoding method of claim 1, wherein on a condition that the default direct dependency flag indicates the layer-specific direct dependency type information is present in the VPS, the method further comprises: determining a first direct dependency type for a first layer of the plurality of layers in relation to a second layer of the plurality of layers based on the layer-specific direct dependency type information in the VPS;
determining a second direct dependency type for the first layer in relation to a third layer of the plurality of layers based on the layer-specific direct dependency type information in the VPS; and
decoding the first layer based on the first and second direct dependency types.

6. The video decoding method of claim 5, wherein the first direct dependency type indicates that the second layer can be used for the inter-layer motion prediction of the first layer, and the second direct dependency type indicates that the third layer can be used for the inter-layer sample prediction of the first layer.

7. A video decoding device comprising:
a processor configured to:
receive a video bitstream comprising a video parameter set (VPS) and a plurality of layers;
determine direct dependency relations associated with the plurality of layers based on a default direct dependency flag in the VPS, wherein:
on a condition that the default direct dependency flag indicates layer-specific direct dependency type information is present in the VPS, the direct dependency relations are determined from the layer-specific direct dependency type information in the VPS, and on a condition that the default direct dependency flag indicates the layer-specific direct dependency type information is absent in the VPS, the direct dependency relations are determined based on a default dependency, wherein the default dependency indicates whether lower layers of a current layer can be used for an inter-layer sample prediction and whether the lower layers of the current layer can be used for an inter-layer motion prediction for the current layer; and
decode the video bitstream based on the determined direct dependency relations.

8. The video decoding device of claim 7, wherein the default direct dependency indicates that direct dependent layers of the current layer can be used for the inter-layer sample prediction and the inter-layer motion prediction for the current layer.

9. The video decoding device of claim 7, wherein the default direct dependency flag indicates the layer-specific direct dependency type information is absent in the VPS when the default direct dependency flag equals to 1, and the default direct dependency flag indicates the layer-specific direct dependency type information is present in the VPS when the default direct dependency flag equals to 0.

10. The video decoding device of claim 7, wherein the processor is configured to:
on a condition that the default direct dependency flag indicates the layer-specific direct dependency type information is absent in the VPS, decode video bitstream based on the default dependency.

11. The video decoding device of claim 7, wherein the processor is configured to:
on a condition that the default direct dependency flag indicates the layer-specific direct dependency type information is present in the VPS:
determine a first direct dependency type for a first layer of the plurality of layers in relation to a second layer of the plurality of layers based on the layer-specific direct dependency type information in the VPS;
determine a second direct dependency type for the first layer in relation to a third layer of the plurality of layers based on the layer-specific direct dependency type information in the VPS; and
decode the first layer based on the first and second direct dependency types.

12. The video decoding device of claim 11, wherein the first direct dependency type indicates that the second layer can be used for the inter-layer motion prediction of the first layer, and the second direct dependency type indicates that the third layer can be used for the inter-layer sample prediction of the first layer.

13. A video coding method comprising:
determining whether to use a default dependency for encoding a video content into a plurality of layers;
determining whether to include layer-specific direct dependency type information in a video parameter set (VPS), wherein:
on a condition that the default dependency is used for encoding the video content, bypassing signaling the layer-specific direct dependency type information in the VPS, wherein the default dependency indicates whether lower layers of a current layer can be used for an inter-layer sample prediction and whether the lower layers of the current layer can be used for an inter-layer motion prediction for the current layer, and on a condition that the default dependency is not used, including the layer-specific direct dependency type information in the VPS; and
setting a default direct dependency flag in the VPS for indicating whether the layer-specific direct dependency type information is included in the VPS.

14. The video coding method of claim 13, further comprising:
based on a determination to include the layer-specific direct dependency type information in the VPS:
indicating a first dependency type for a first layer of the plurality of layers in relation to a second layer of the plurality of layers in the VPS;
indicating a second dependency type for the first layer of the plurality of layers in relation to a third layer of the plurality of layers in the VPS; and
encoding the first layer based on the first and second dependency types.

15. The video coding method of claim 13, further comprising;
  determining a reference layer limit based on a profile associated with the video content; and
  encoding the video content such that a total number of direct and indirect reference layers for a layer of the plurality of layers is less than or equal to the reference layer limit.

16. The video coding method of claim 15, wherein the reference layer limit is determined based on a reference layer limit indication in the profile associated with the video content.

17. A video coding device comprising:
  a processor configured to:
  determine whether to use a default dependency for encoding a video content into a plurality of layers;
  determine whether to include layer-specific direct dependency type information in a video parameter set (VPS), wherein:
  the processor is configured to bypass signaling the layer-specific direct dependency type information in the VPS on a condition that the default dependency is used, wherein the default dependency indicates whether lower layers of a current layer can be used for an inter-layer sample prediction and whether the lower layers of the current layer can be used for an inter-layer motion prediction for the current layer, and
  the processor is configured to include the layer-specific direct dependency type information in the VPS on a condition that the default dependency is not used; and
  set a default direct dependency flag in the VPS for indicating whether the layer-specific direct dependency type information is included in the VPS.

18. The video coding device of claim 17, wherein the processor is further configured to, based on a determination to include the layer-specific direct dependency type information in the VPS:
  indicate a first dependency type for a first layer of the plurality of layers in relation to a second layer of the plurality of layers in the VPS;
  indicate a second dependency type for the first layer of the plurality of layers in relation to a third layer of the plurality of layers in the VPS; and
  encode the first layer based on the first and second dependency types.

19. The video coding device of claim 17, wherein the processor is further configured to:
  determine a reference layer limit based on the profile associated with the video content; and
  encode the video content such that a total number of direct and indirect reference layers for a layer of the plurality of layers is less than or equal to the reference layer limit.

20. The video coding device of claim 19, wherein the reference layer limit is determined based on a reference layer limit indication in the profile associated with the video content.

* * * * *